(12) United States Patent
Mechi

(10) Patent No.: US 8,064,232 B2
(45) Date of Patent: Nov. 22, 2011

(54) POWER CONVERSION DEVICE AND POWER CONVERSION SYSTEM

(75) Inventor: Abdallah Mechi, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 793 days.

(21) Appl. No.: 12/087,061

(22) PCT Filed: Dec. 21, 2006

(86) PCT No.: PCT/JP2006/325494
§ 371 (c)(1),
(2), (4) Date: Jun. 25, 2008

(87) PCT Pub. No.: WO2007/074710
PCT Pub. Date: Jul. 5, 2007

(65) Prior Publication Data
US 2009/0034305 A1    Feb. 5, 2009

(30) Foreign Application Priority Data

Dec. 26, 2005    (JP) ................................ 2005-371932

(51) Int. Cl.
*H02J 1/10*    (2006.01)
(52) U.S. Cl. ............ 363/65; 363/67; 363/68; 363/21.12
(58) Field of Classification Search .................... 363/65, 363/67, 68, 21.12
See application file for complete search history.

(56) References Cited

U.S. PATENT DOCUMENTS

| | | | |
|---|---|---|---|
| 4,648,022 A | | 3/1987 | Schauder |
| 5,008,795 A | * | 4/1991 | Parsley et al. .................... 363/20 |
| 6,031,747 A | * | 2/2000 | Ilic et al. ......................... 363/71 |
| 6,137,704 A | | 10/2000 | Ito et al. |
| 6,320,775 B1 | | 11/2001 | Ito et al. |
| 6,580,621 B2 | | 6/2003 | Kolar |
| 7,535,734 B2 | * | 5/2009 | Li et al. ...................... 363/21.01 |

(Continued)

FOREIGN PATENT DOCUMENTS

JP    2-206363 A    8/1990

(Continued)

OTHER PUBLICATIONS

Boon Tech Ooi et al., "An Integrated AC Drive System Using a Controlled-Current PWM Rectifier/Inverter Link", IEEE Transactions on Power Electronics, pp. 64-71, vol. 3, No. 1, Jan. 1988.

(Continued)

*Primary Examiner* — Bao Q Vu
(74) *Attorney, Agent, or Firm* — Birch, Stewart, Kolasch & Birch, LLP

(57) ABSTRACT

A power conversion device includes input terminals, first output terminals, second output terminals, and an insulation transformer. The insulation transformer includes a primary coil and a secondary coil of equal inductance. The polarity of one end of the primary coil is same as the polarity of the other end of the secondary coil. One of the first output terminals is connected to an input terminal and the one end of the primary coil. The other of the first output terminals is connected to an input terminal and one end of the secondary coil. One of the second output terminals is connected to the other end of the primary coil and the other end of the secondary coil. The other of the second output terminals is connected to an input terminal.

14 Claims, 17 Drawing Sheets

U.S. PATENT DOCUMENTS

| | | | |
|---|---|---|---|
| 7,847,535 B2 * | 12/2010 | Meynard et al. | 323/361 |
| 2004/0223351 A1 * | 11/2004 | Kurokami et al. | 363/65 |
| 2005/0286277 A1 * | 12/2005 | Krein | 363/65 |
| 2007/0046592 A1 | 3/2007 | Ono et al. | |
| 2008/0304292 A1 * | 12/2008 | Zeng et al. | 363/21.12 |

FOREIGN PATENT DOCUMENTS

| | | |
|---|---|---|
| JP | 7-107744 A | 4/1995 |
| JP | 10-66333 A | 3/1998 |
| JP | 11-127580 A | 5/1999 |
| JP | 2004-215406 A | 7/2004 |
| JP | 2004-215407 A | 7/2004 |
| JP | 2004-215408 A | 7/2004 |
| JP | 2005-80484 A | 3/2005 |
| JP | 2006-309258 A | 11/2006 |
| KR | 10-1999-006545 A | 1/1999 |
| KR | 10-2002-0010499 A | 2/2002 |

OTHER PUBLICATIONS

E.R. Motto et al., "Applications Characteristics of an Experimental RB-IGBT(Reverse Blocking IGBT) Module", Industry Applications Conference, 2004. 39th IAS Annual Meeting. Conference Record of the 2004 IEEE, pp. 1540-1544, vol. 3, Oct. 3-7, 2004.

* cited by examiner

F I G. 6
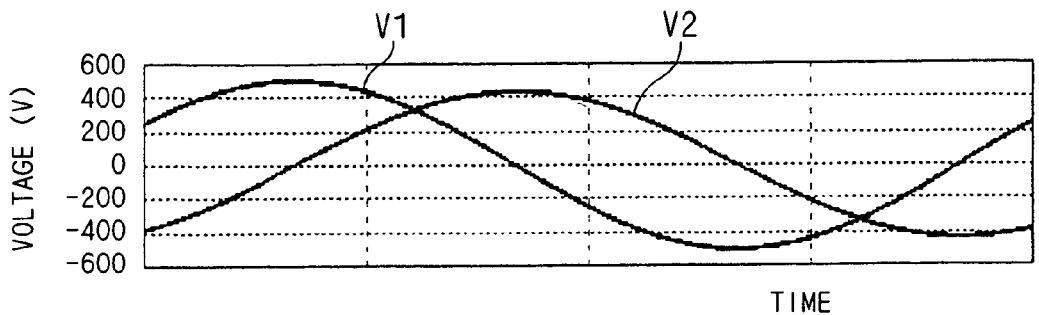
F I G. 7
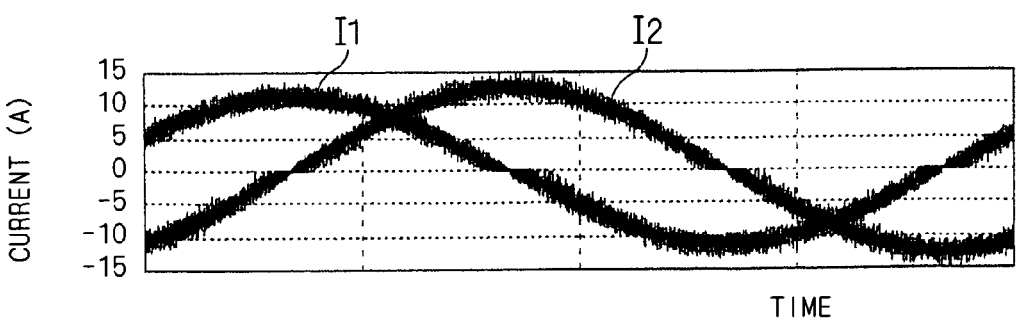
F I G. 8
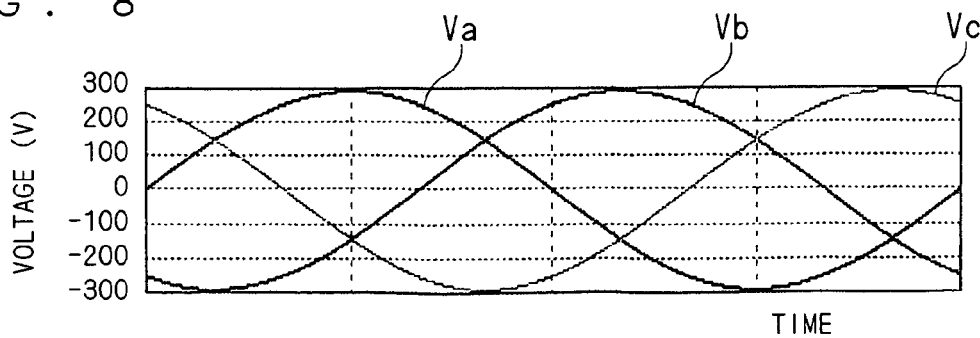
F I G. 9
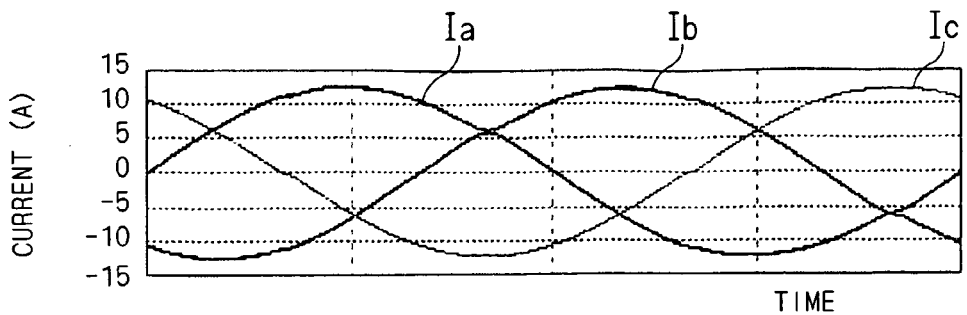

F I G . 2 9
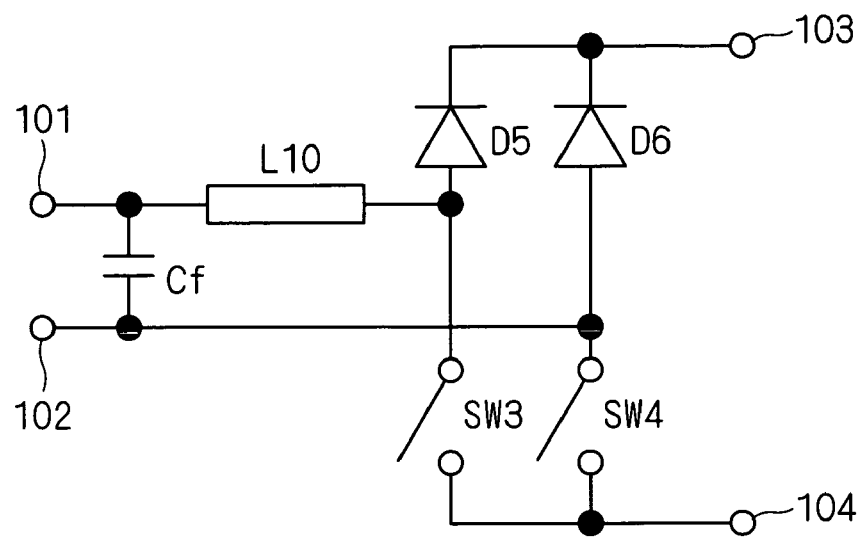
F I G . 3 0
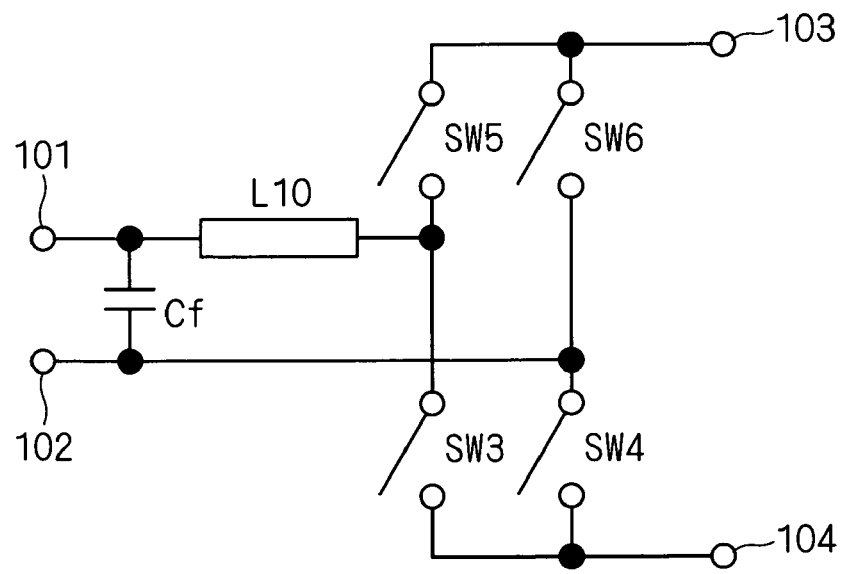

F I G. 3 5
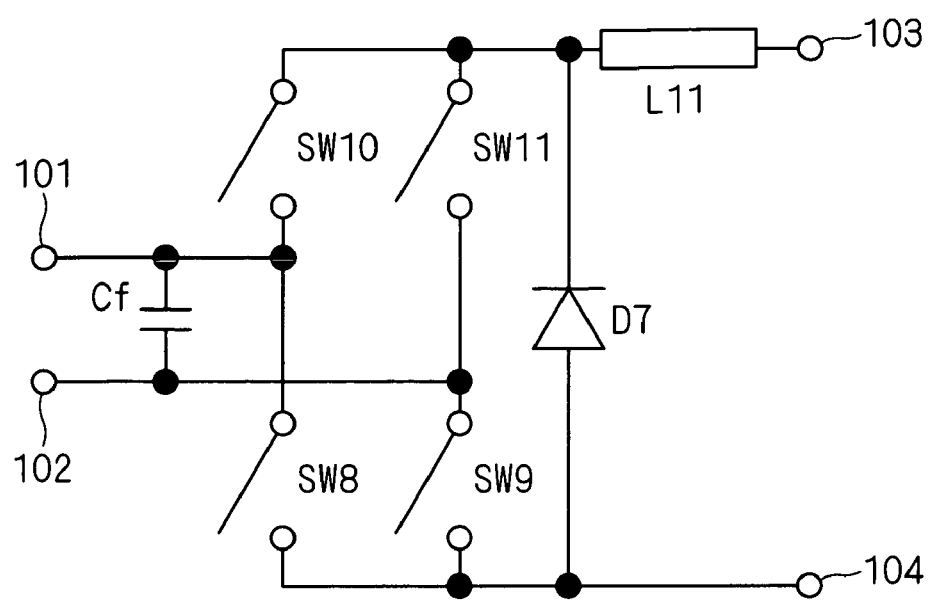

F I G. 3 6
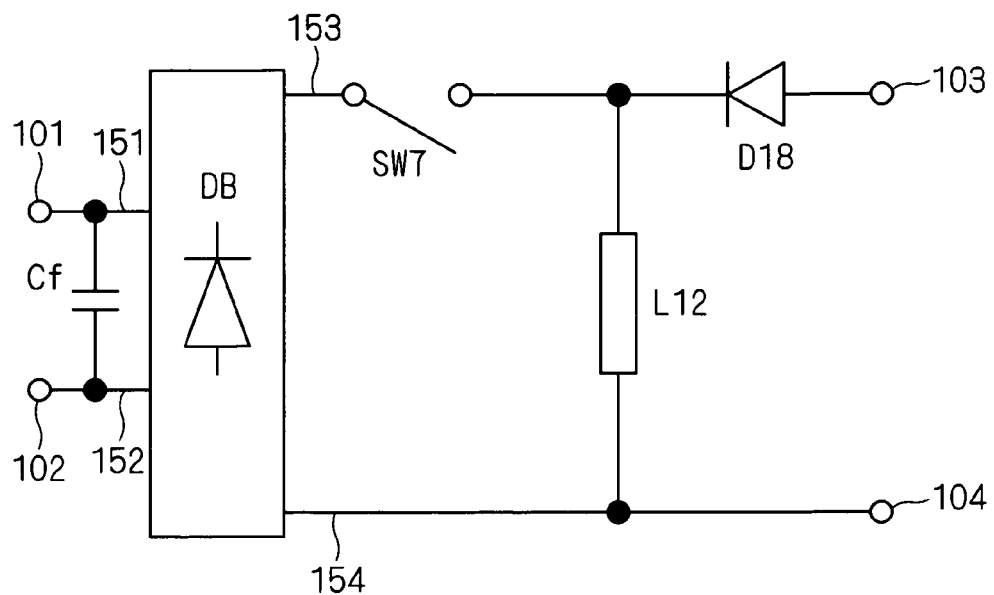
F I G. 3 7
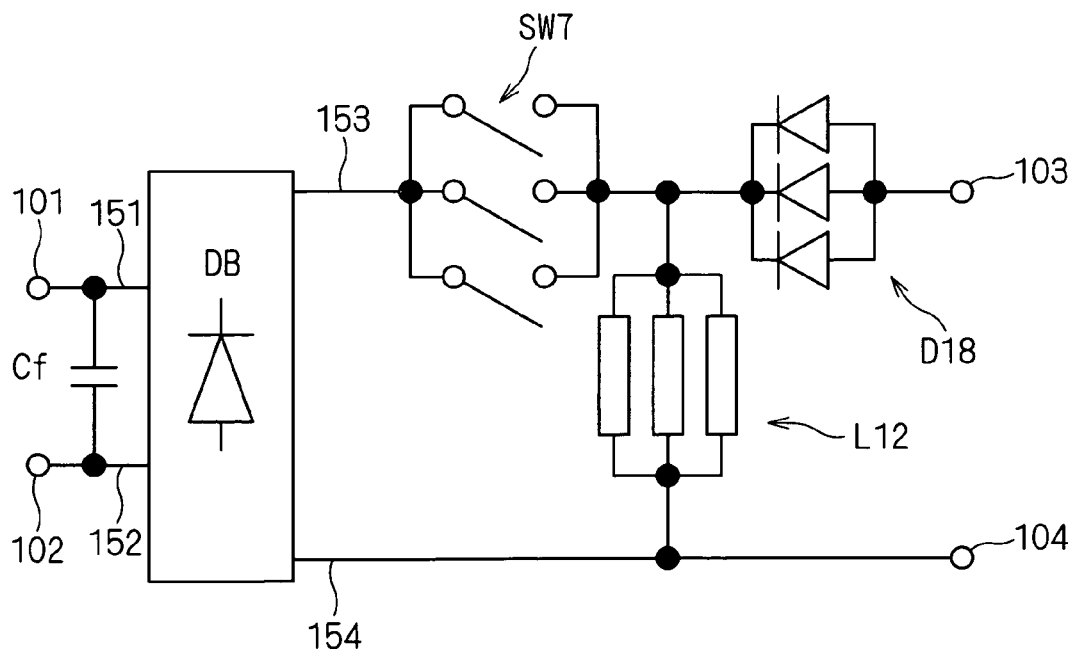

POWER CONVERSION DEVICE AND POWER CONVERSION SYSTEM

TECHNICAL FIELD

The present invention relates to a power conversion device and a power conversion system, and particularly to three-phase/two-phase conversion.

BACKGROUND ART

For conversion of three-phase power to dc power, power conversion devices adopt active converters or matrix converters in order to reduce harmonics generated in the power supplies.

Techniques related to the present invention are shown below.

Patent Document 1: Japanese Patent Application Laid-Open No. 2004-215406
Patent Document 2: Japanese Patent Application Laid-Open No. 2004-215408
Patent Document 3: Japanese Patent Application Laid-Open No. 2004-215407
Patent Document 4: U.S. Pat. No. 4,648,022
Patent Document 5: U.S. Pat. No. 6,580,621
Non-Patent Document 1: Boon Tech OOI and three others, "An Integrated AC Drive System Using a Controlled-Current PWM Rectifier/Inverter Link", IEEE TRANSACTIONS ON POWER ELECTRONICS, pp. 64-71, VOL3, NO1, Jan. 1988
Non-Patent Document 2: E. R. Motto and five others, "Application Characteristics of an Experimental RB-IGBT (Reverse Blocking IGBT) Module", Industry Applications Conference, 2004. 39th IAS Annual Meeting. Conference Record of the 2004 IEEE, Volume 3, 3-7 Oct. 2004 Page(s): 1540-1544 vol. 3

DISCLOSURE OF THE INVENTION

Problems to be Solved by the Invention

For single-phase systems, PFC (Power Factor Correction) circuits are already commercially available. However, for three-phase systems, an active converter requires 6 switching elements, and a matrix converter requires 18 switching elements, leading to increased costs and reduced conversion efficiency due to switching loss.

The present invention has been made by considering the situations above, and an object of the present invention is to suppress the cost increase and conversion efficiency reduction by reducing the number of switching elements, and also to prevent generation of harmonics in a power supply.

Means for Solving the Problems

According to a first aspect of the power conversion device of the present invention, a power conversion device comprises: an insulation transformer (11) having a primary coil (L1) and a secondary coil (L2) of equal inductance; first to third input terminals (121 to 123); a pair of first output terminals (131, 132); and a pair of second output terminals (141, 142), wherein one (131) of said first output terminals is connected to said first input terminal (121) and one end (111) of said primary coil, the other (132) of said first output terminals is connected to said second input terminal (122) and one end (113) of said secondary coil, one (141) of said second output terminals is connected to the other end (112) of said primary coil and the other end (114) of said secondary coil, the other (142) of said second output terminals is connected to said third input terminal (123), and said one end of said primary coil has a polarity same as that of said other end of said secondary coil.

According to a second aspect of the power conversion device of the present invention, a power conversion device comprises: a coil (L3); first to third input terminals (221 to 223); a pair of first output terminals (231, 232); and a pair of second output terminals (241, 242), wherein one (231) of said first output terminals is connected to said first input terminal (221) and one end (211) of said coil, the other (232) of said first output terminals is connected to said second input terminal (222) and the other end (212) of said coil, one (241) of said second output terminals is connected to said coil at a position (213) between said one end and said other end of said coil, the other (242) of said second output terminals is connected to said third input terminal (223), and the inductance between said one end of said coil and said position and the inductance between said other end of said coil and said position are equal to each other.

According to a third aspect of the power conversion device of the present invention, the power conversion device of the second aspect further comprises a first insulation transformer (22) connected between said pair of said first output terminals (231, 232) and said first and second input terminals (221, 222), wherein said pair of said first output terminals are connected to both ends (214, 215) of a secondary coil (L4) of said first insulation transformer, and said first insulation transformer has said coil (L3) as a primary coil.

According to a fourth aspect of the power conversion device of the present invention, the power conversion device of the third aspect further comprises a first capacitor (C1), and said first capacitor is connected between both ends (214, 215) of said secondary coil (L4) of said first insulation transformer (22).

According to a fifth aspect of the power conversion device of the present invention, the power conversion device of the third or fourth aspect further comprises a second insulation transformer (23) connected between said pair (241, 242) of said second output terminals and said third input terminal (223) and said position (213), wherein said third input terminal and said position are respectively connected to both ends (231, 232) of a primary coil (L5) of said second insulation transformer, and said pair of said second output terminals are respectively connected to both ends (233, 234) of a secondary coil (L6) of said second insulation transformer.

According to a sixth aspect of the power conversion device of the present invention, the power conversion device of the fifth aspect further comprises a second capacitor (C2), and said second capacitor is connected between said both ends (233, 234) of said secondary coil (L6) of said second insulation transformer.

According to a first aspect of the power conversion system of the present invention, a power conversion system comprises: the power conversion device (1) according to any of the first to sixth aspects; and a first converter (31; 32) having a pair of input ends (311, 312; 321, 322) and a pair of output ends (313, 314; 323, 324), and said pair of said input ends of said first converter are connected to one pair of said pairs (131, 132; 141, 142) of said first output terminals and said second output terminals.

According to a second aspect of the power conversion system of the present invention, the power conversion system of the first aspect further comprises a second converter (32; 31) having a pair of input ends (321, 322; 311, 312) and a pair of output ends (323, 324; 313, 314), and said pair of said input ends of said second converter are connected to the other pair of said pairs (141, 142; 131, 132) of said first output terminals and said second output terminals.

Effects of the Invention

According to the first aspect or the second aspect of the power conversion device of the present invention, it is possible to cause the first output terminals to output an alternating voltage equal to the line voltage of a three-phase power supply connected to the first to third input terminals, and to cause the second output terminals to output an alternating voltage differing by 90° in phase from the alternating voltage. That is, the three-phase alternating voltages inputted to the first to third input terminals can be converted to two-phase alternating voltages.

Also, the power outputted from the first output terminals and the power outputted from the second output terminals is made equal just by connecting single-phase PFC circuits to the first output terminals and the second output terminals. The powers inputted to the first to third input terminals is thus made equal to each other, preventing generation of harmonics in the three-phase power supply. Also, the number of switching elements is reduced and the cost is reduced.

According to the third aspect of the power conversion device of the present invention, it is possible to covert an alternating voltage equal to the line voltage of the three-phase power supply into a desired alternating voltage and to output it from the first output terminals. It is thus possible to make the alternating voltage outputted from the first output terminals equal to the alternating voltage outputted from the second output terminals.

According to the fourth aspect of the power conversion device of the present invention, the first capacitor and the secondary coil constitute a filter. The filter removes noise.

According to the fifth aspect of the power conversion device of the present invention, it is possible to convert an alternating voltage applied to the primary coil of the second insulation transformer into a desired alternating voltage and to output it from the second output terminals.

According to the sixth aspect of the power conversion device of the present invention, the first capacitor and the secondary coil constitutes a filter. The filter removes noise.

According to the first aspect of the power conversion system of the present invention, the first converter is capable of converting an alternating voltage outputted from the power conversion device into a desired dc voltage and outputting it to its own output ends, making it possible to set the power outputted from the output terminals to a desired value. It is thus possible to make the power equal to the power outputted from the other output terminals, and hence to make equal the powers inputted from the first to third input terminals. This prevents generation of harmonics in the three-phase power supply connected to the first to third input terminals.

According to the second aspect of the power conversion system of the present invention, the second converter is capable of converting an alternating voltage outputted from the power conversion device into a desired dc voltage and outputting it to its own output ends. Therefore, it is easier to make equal the power outputted from the output terminals on one side and the power outputted from the output terminals on the other side, than when the control is provided only with the first converter.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram illustrating the waveforms of alternating voltages V1 and V2.

FIG. 7 is a diagram illustrating the waveforms of alternating currents I1 and I2.

FIG. 8 is a diagram illustrating the waveforms of three-phase alternating voltages Va, Vb and Vc.

FIG. 9 is a diagram illustrating the waveforms of three-phase alternating currents Ia, Ib and Ic.

FIGS. 26 to 40 are circuit diagrams conceptually illustrating a PFC circuit.

BEST MODE FOR CARRYING OUT THE INVENTION

First Preferred Embodiment

Figure 1:
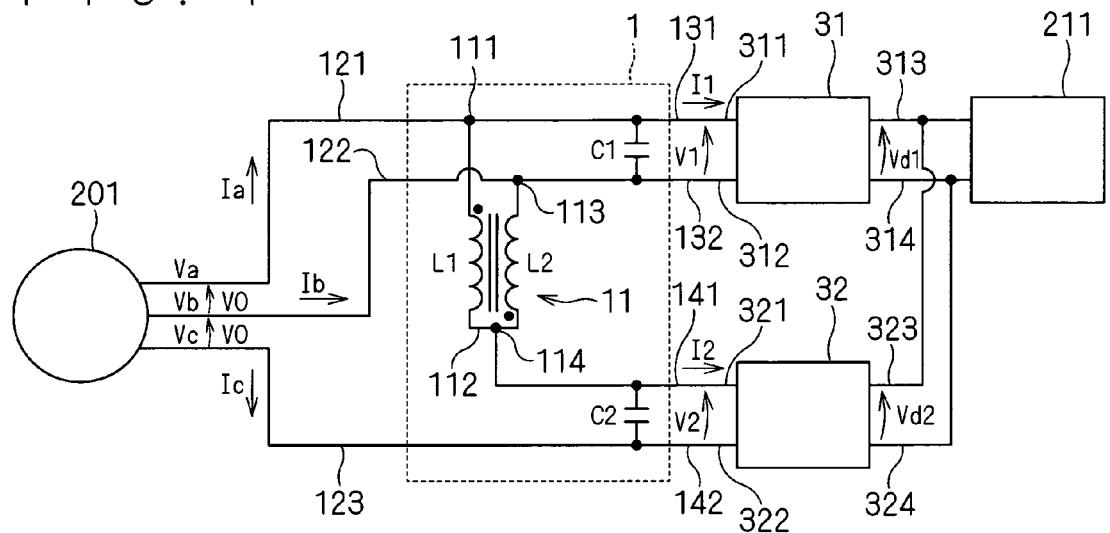
FIGS. 1 and 2 are circuit diagrams conceptually illustrating a power conversion system according to a first preferred embodiment.
Figure 2:
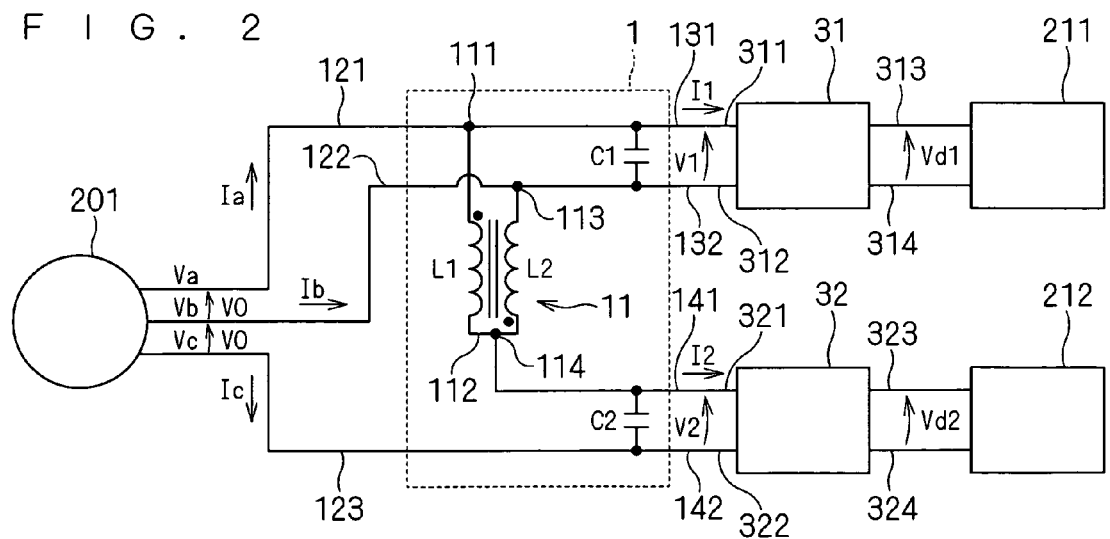

FIGS. 1 and 2 are circuit diagrams conceptually illustrating power conversion systems of this preferred embodiment. The power conversion systems each include a power conversion device 1 and converters 31 and 32.

FIG. 1 also shows a three-phase power supply 201 and a load 211. FIG. 2 further shows a load 212. The three-phase power supply 201 supplies power to the power conversion system. The loads 211 and 212 are supplied with power outputted from the power conversion system.

The power conversion device 1 includes input terminals 121 to 123, first output terminals 131 and 132, second output terminals 141 and 142, and an insulation transformer 11.

The input terminals 121 to 123 are connected to the three-phase power supply 201, and supplied with power from the three-phase power supply 201.

The insulation transformer 11 has a primary coil L1 and a secondary coil L2 of equal inductance. The polarity of one end 111 of the primary coil L1 is same as the polarity of the other end 114 of the secondary coil L2.

One of the first output terminals, 131, is connected to the input terminal 121 and to the one end 111 of the primary coil L1. The other of the first output terminals, 132, is connected to the input terminal 122 and to one end 113 of the secondary coil L2.

One of the second output terminals, 141, is connected to the other end 112 of the primary coil L1 and to the other end 114 of the secondary coil L2. The other of the second output terminals, 142, is connected to the input terminal 123.

According to the power conversion device 1, it is possible to cause the first output terminals 131 and 132 to output an alternating voltage V1 that is equal to the line voltage V0 of the three-phase power supply 201 connected to the input terminals 121 to 123. It is also possible to cause the second output terminals 141 and 142 to output an alternating voltage V2 that differs by 90° in phase from the alternating voltage V1. This is because the primary coil L1 and the secondary coil L2 have equal inductance and therefore the potential of the one 141 of the second output terminals takes a value intermediate between the potential of the input terminal 121 and the potential of the input terminal 122.

That is, the three-phase alternating voltages Va, Vb and Vc (FIGS. 1 and 2) inputted to the input terminals 121 to 123 can be converted to orthogonal two-phase alternating voltages V1 and V2. The effective value of the alternating voltage V2 is $\sqrt{3}/2$ times the effective value of the line voltage.

Connecting a capacitor C1 between the first output terminals 131 and 132 is desirable, in order to remove noise of the alternating voltage V1 outputted from the first output terminals 131 and 132.

Connecting a capacitor C2 between the second output terminals 141 and 142 is desirable, in order to remove noise of the alternating voltage V2 outputted from the second output terminals 141 and 142. Furthermore, the capacitor C2 and the coils L1 and L2 constitute a filter, and the filter removes noise.

The converter 31 has input ends 311 and 312 and output ends 313 and 314. The input ends 311 and 312 are connected respectively to the first output terminals 131 and 132.

The alternating voltage V1 outputted to the first output terminals 131 and 132 is orthogonal to the alternating voltage V2 outputted to the second output terminals 141 and 142, and therefore it is possible to control the power outputted to the first output terminals 131 and 132 independently of the second output terminals 141 and 142 side.

Specifically, the converter 31 is capable of converting the alternating voltage V1 outputted from the power conversion device 1 into a desired dc voltage Vd1, and outputting it to the output ends 313 and 314, and thus the power P1 outputted from the output terminals 131 and 132 can be set to a desired value.

Thus, it is possible to make the power P1 equal to the power P2 outputted from the output terminals 141 and 142, and so the powers P11 to P13 inputted from the input terminals 121 to 123 can be equal to each other. This prevents generation of harmonics in the three-phase power supply 201.

The converter 32 has input ends 321 and 322 and output ends 323 and 324. The input ends 321 and 322 are connected respectively to the second output terminals 141 and 142.

The alternating voltage V2 outputted to the second output terminals 141 and 142 is orthogonal to the alternating voltage V1 outputted to the first output terminals 131 and 132, and therefore it is possible to control the converter 32 independently of the converter 31.

Specifically, the converter 32 is capable of converting the alternating voltage V2 outputted from the power conversion device 1 into a desired dc voltage Vd2, and outputting it to the output ends 323 and 324. Accordingly, it is easier to equalize the power P1 and the power P2, than when control is provided only with the converter 31.

The power conversion device 1 converts the three-phase alternating voltages Va, Vb and Vc into the two-phase alternating voltages V1 and V2, and so single-phase alternating voltages are inputted respectively to the converters 31 and 32. Accordingly, single-phase PFC circuits can be adopted for the converters 31 and 32. They can be controlled independently of each other, and so a known single-phase PFC circuit control scheme can be used. Such single-phase PFC circuits can adopt already known circuits as shown in FIGS. 3 and 26 to 40, for example. Specific examples of the PFC circuits will be described later.

Furthermore, the power conversion device 1 needs no switching element. Accordingly, the number of switching elements included in the power conversion system is smaller than the numbers of elements included in active converters and matrix converters, enabling cost reduction.

FIG. 1 shows an example in which the load 211 is connected to the output ends 313 and 314 of the converter 31, and the output ends 323 and 324 of the converter 32 are connected respectively to the output ends 313 and 314. In this case, the dc voltage Vd1 and the dc voltage Vd2 are equal to each other, and the current Id1 flowing on the converter 31 side and the current Id2 flowing on the converter 32 side are also equal to each other. Accordingly, the power outputted from the converter 31 and the power outputted from the converter 32 are equal, and therefore the power P1 and the power P2 are nearly equal. Connecting a capacitor Cd between the output ends 313 and 314 is desirable in order to remove ripples contained in the outputs from the converters 31 and 32, and FIG. 1 shows such a configuration.

FIG. 2 shows an example in which the load 211 is connected to the output ends 313 and 314 of the converter 31, and the load 212 is connected to the output ends 323 and 324 of the converter 32. In this case, by controlling the converters 31 and 32, the power outputted from the converter 31 and the power outputted from the converter 32 are made equal to each other, and then the power P1 and the power P2 are made nearly equal. Connecting a capacitor Cd1 between the output ends 313 and 314, and a capacitor Cd2 between the output ends 323 and 324, is desirable in order to remove ripples contained in the outputs from the converters 31 and 32, and FIG. 2 shows such a configuration.

Figure 3:
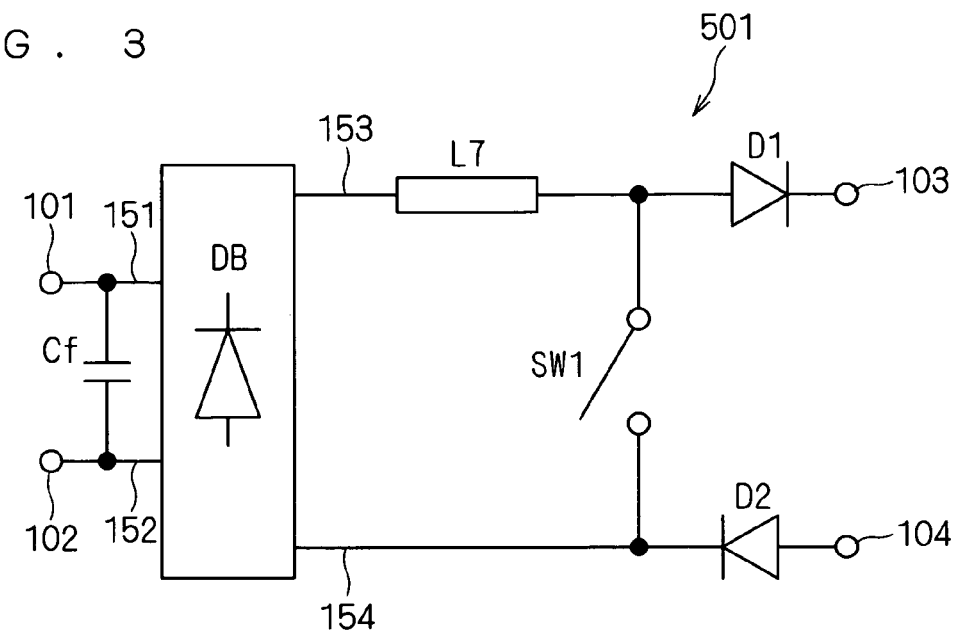
FIG. 3 is a circuit diagram conceptually illustrating a PFC circuit.

FIG. 3 illustrates a PFC circuit 501 that can be adopted for the converters 31 and 32. The PFC circuit 501 includes a diode bridge DB, a capacitor Cf, a coil L7, diodes D1 and D2, and a switch SW1.

The PFC circuit 501 further includes input ends 101 and 102 and output ends 103 and 104. When the PFC circuit 501 is adopted for the converter 31, the input ends 101 and 102 and the output ends 103 and 104 can be regarded respectively as the input ends 311 and 312 and the output ends 313 and 314, while they can be regarded respectively as the input ends 321 and 322 and the output ends 323 and 324 when it is adopted for the converter 32. The same is true also for the converters shown in FIGS. 26 to 40 that will be described later.

The diode bridge DB has its input ends 151 and 152 and output ends 153 and 154. The input ends 151 and 152 are connected respectively to the input ends 101 and 102. The capacitor Cf is connected between the input ends 101 and 102. The diode D1 has its anode connected to the output end 153 through the coil L7, and its cathode connected to the output end 103. The diode D2 has its anode connected to the output end 104 and its cathode connected to the output end 154. The switch SW1 is connected between the anode of the diode D1 and the cathode of the diode D2. This PFC circuit 501 functions as a step-up/step-down chopper.

Figure 4:
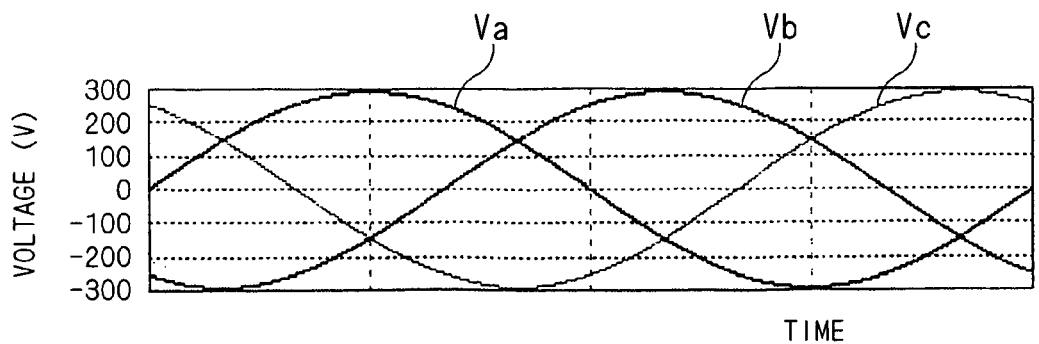
FIG. 4 is a diagram illustrating the waveforms of three-phase alternating voltages Va, Vb and Vc.
Figure 5:
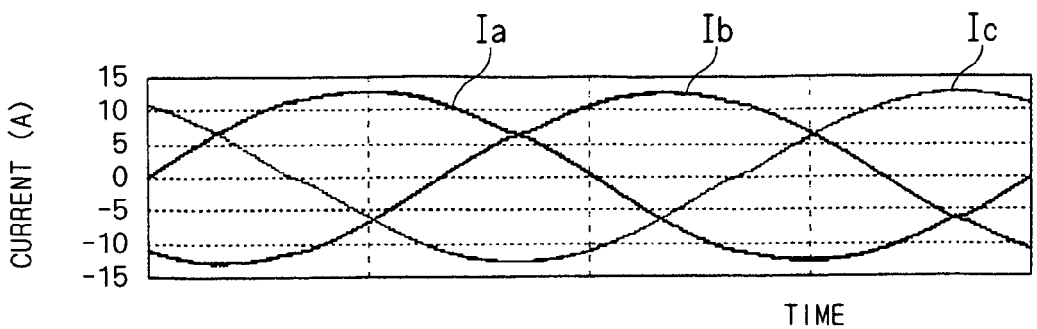
FIG. 5 is a diagram illustrating the waveforms of three-phase alternating currents Ia, Ib and Ic.

When the PFC circuit 501 is adopted for the converters 31 and 32 of the power conversion system shown in FIG. 1, the three-phase alternating currents Ia, Ib and Ic (FIG. 1) exhibit the waveforms of FIG. 5, the alternating voltages V1 and V2 exhibit the waveforms of FIG. 6, and the alternating currents I1 and I2 exhibit the waveforms of FIG. 7. Where the three-phase alternating voltages Va, Vb and Vc (FIG. 1) as shown in FIG. 4 are inputted respectively to the input terminals 121 to 123. The alternating current I1 (FIG. 1) flows in the first output terminals 131 and 132, and the alternating current I2 (FIG. 1) flows in the second output terminals 141 and 142, which are true also for the power conversion system shown in FIG. 2.

Figure 10:
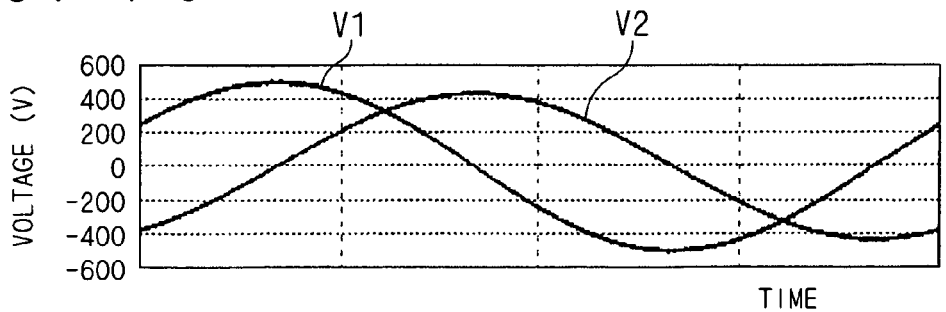
FIG. 10 is a diagram illustrating the waveforms of alternating voltages V1 and V2.
Figure 11:
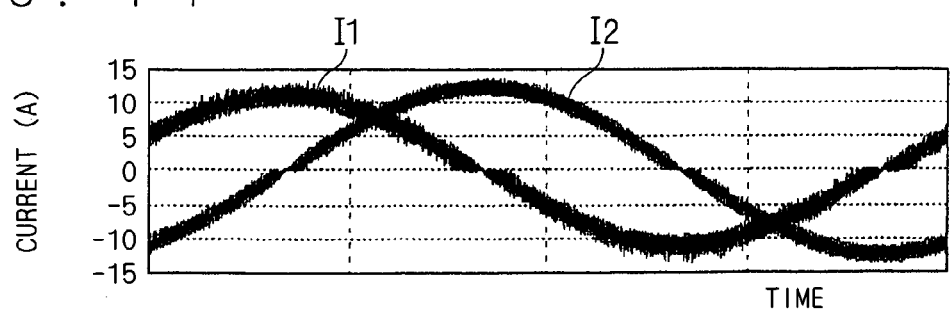
FIG. 11 is a diagram illustrating the waveforms of alternating currents I1 and I2.

When the PFC circuit 501 is adopted for the converters 31 and 32 of the power conversion system shown in FIG. 2, the three-phase alternating currents Ia, Ib and Ic (FIG. 2) exhibit the waveforms of FIG. 9, the alternating voltages V1 and V2 exhibit the waveforms of FIG. 10, and the alternating currents I1 and I2 exhibit the waveforms of FIG. 11. Where the three-phase alternating voltages Va, Vb and Vc (FIG. 2) as shown in FIG. 8 are inputted respectively to the input terminals 121 to 123.

The three-phase alternating currents Ia, Ib and Ic (FIGS. 5 and 9), the alternating voltages V1 and V2 (FIGS. 6 and 10), and the alternating currents I1 and I2 (FIGS. 7 and 11) are all sinusoidal waves, and they contain almost no noise other than chopper noise of the PFC circuit 501.

In the power conversion systems of this preferred embodiment, a voltage that is ½ times the line voltage V0 is applied to each of the primary coil L1 and the secondary coil L2, and a current that is ½ times the current Ia (=Ib=Ic) flowing through the input terminals 121 to 122 flows. In this case, the power capacitance Pr1 of the power conversion device 1 is expressed by Expression (1). Where Vr1 and Ir1 respectively denote the effective values of the voltage and current of the primary coil, Vr2 and Ir2 respectively denote the effective values of the voltage and current of the secondary coil, and Vr and Ir respectively denote the effective values of the line voltage V0 and current Ia (=Ib=Ic).

[Expression 1]

$$Pr1 = Vr1 \times Ir1 = Vr2 \times Ir2 = \frac{\sum_{n=1}^{2} Vrn \times Irn}{2} = \frac{1}{4} Vr \times Ir \quad \Lambda \quad (1)$$

Then, the input capacitance Pin inputted to the power conversion system is √3·Vr·Ir, and the power capacitance Pr1 is 14.4% of the input capacitance Pin.

As compared with an active converter, the current flowing in the primary coil L1 and the secondary coil L2 can be half of the current flowing in the three-phase ac reactor of the active converter. Also, the copper losses of the primary coil and the secondary coil are reduced to 1/12 times as compared with the copper loss of a three-phase ac reactor.

Second Preferred Embodiment

Figure 12:
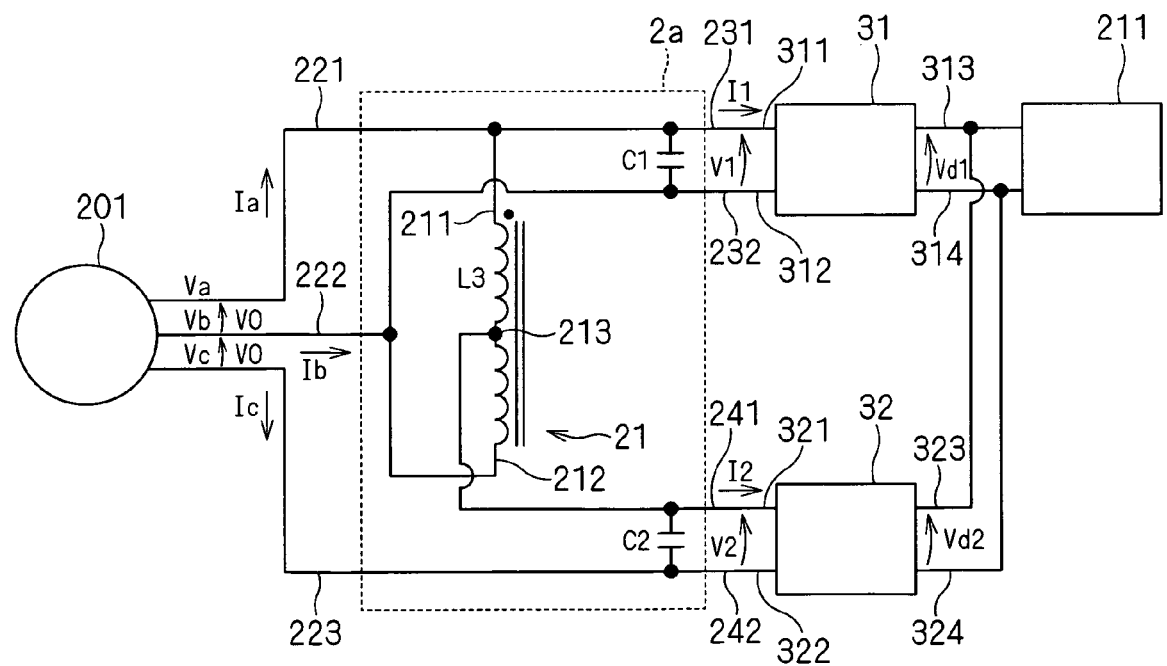
FIGS. 12 and 13 are circuit diagrams conceptually illustrating a power conversion system according to a second preferred embodiment.
Figure 13:
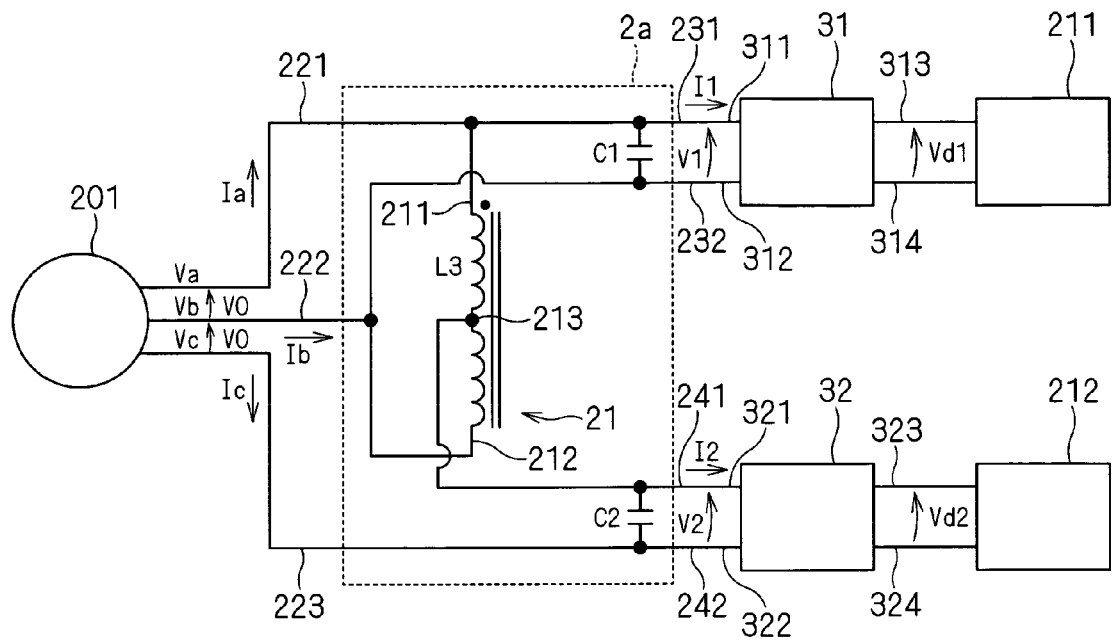

FIGS. 12 and 13 are circuit diagrams conceptually illustrating power conversion systems of this preferred embodiment. The power conversion systems each include a power conversion device 2a and converters 31 and 32.

The power conversion device 2a includes input terminals 221 to 223, first output terminals 231 and 232, second output terminals 241 and 242, and an autotransformer 21.

The input terminals 221 to 223 are connected to a three-phase power supply 201, and supplied with power from the three-phase power supply 201.

The autotransformer 21 has a coil L3. FIGS. 12 and 13 show a position 213 between one end 211 and the other end 212 of the coil L3. The inductance between that one end 211 of the coil L3 and the position 213, and the inductance between that other end 212 of the coil L3 and the position 213, are equal. Accordingly, the portion of the coil L3 between that one end 211 and the position 213 and the portion between the position 213 and that other end 212 function respectively as the coils L1 and L2 of the first preferred embodiment (FIGS. 1 and 2). The autotransformer 21 thus functions in the same way as the insulation transformer 11.

One of the first output terminals, 231, is connected to the input terminal 221 and that one end 211 of the coil L3. The other of the first output terminals, 232, is connected to the input terminal 222 and that other end 212 of the coil L3.

One of the second output terminals, 241, is connected to the coil L3 at the position 213. The other 242 of the second output terminals is connected to the input terminal 223.

According to the power conversion device 2a, as in the power conversion device 1 described above, it is possible to cause the first output terminals 231 and 232 to output an alternating voltage V1 that is equal to the line voltage V0 of the three-phase power supply 201 connected to the input terminals 221 to 223. It is also possible to cause the second output terminals 241 and 242 to output an alternating voltage V2 that differs by 90° in phase from the alternating voltage V1. That is, the three-phase alternating voltages Va, Vb and Vc (FIGS. 1 and 2) inputted to the input terminals 221 to 223 can be converted to the two-phase alternating voltages V1 and V2.

As in the power conversion device 1, it is desirable to connect a capacitor C1 between the first output terminals 231 and 232, and a capacitor C2 between the second output terminals 241 and 242.

The input ends 311 and 312 of the converter 31 are connected respectively to the first output terminals 231 and 232 and offer the same effect as described in the first preferred embodiment.

The input ends 321 and 322 of the converter 32 are connected respectively to the second output terminals 241 and 242 and offer the same effect as described in the first preferred embodiment.

The power conversion device 2a converts the three-phase alternating voltages Va, Vb and Vc into the two-phase alternating voltages V1 and V2, and so single-phase alternating voltages are inputted respectively to the converters 31 and 32. Accordingly, single-phase PFC circuits (FIGS. 3 and 26 to 40) can be adopted for the converters 31 and 32. This enables cost reduction as in the first preferred embodiment.

FIG. 12 shows an example in which a load 211 is connected to the output ends 313 and 314 of the converter 31, and the output ends 323 and 324 of the converter 32 are connected respectively to the output ends 313 and 314. In this case, as described in the first preferred embodiment, the power P1 and the power P2 are nearly equal. Connecting a capacitor Cd between the output ends 313 and 314 is desirable from the same viewpoint as described in the first preferred embodiment.

FIG. 13 shows an example in which a load 211 is connected to the output ends 313 and 314 of the converter 31, and a load 212 is connected to the output ends 323 and 324 of the converter 32. In this case, as described in the first preferred embodiment, by control of the converters 31 and 32, the power P1 and the power P2 are set nearly equal. Connecting a capacitor Cd1 between the output ends 313 and 314, and a capacitor Cd2 between the output ends 323 and 324, is desirable from the same viewpoint as described in the first preferred embodiment.

When the PFC circuit 501 (FIG. 3) is adopted for the converters 31 and 32 in the power conversion system shown in FIG. 12, the three-phase alternating currents Ia, Ib and Ic exhibit the waveforms of FIG. 5, the alternating voltages V1 and V2 exhibit the waveforms of FIG. 6, and the alternating currents I1 and I2 exhibit the waveforms of FIG. 7. In the power conversion system shown in FIG. 13, the three-phase alternating currents Ia, Ib and Ic exhibit the waveforms of FIG. 9, the alternating voltages V1 and V2 exhibit the waveforms of FIG. 10, and the alternating currents I1 and I2 exhibit the waveforms of FIG. 11.

In the power conversion systems of this preferred embodiment, a voltage that is ½ times the line voltage V0 is applied respectively between the one end 211 of the coil L3 and the position 213 and between the other end 212 and the position 213, and a current that is ½ times the current Ia flows. In this case, the power capacitance Pr2 of the power conversion device 2a is expressed by Expression (2). Where a reference character Vlow denotes the effective value (=Vr/2) of the voltage at the position 213 of the coil L3, with respect to the voltage Vb. A reference character Vhi denotes the effective value (=Vr) of the voltage at the one end 211 of the coil L3, with respect to the voltage Vb.

[Expression 2]

$$Pr2 = (Vlow \times Ir) \times \frac{(Vhi - Vlow)}{Vhi} \qquad (2)$$
$$= \frac{1}{4} Vr \times Ir \, \Lambda$$

Then, the power capacitance Pr is 14.4% of the input capacitance Pin.

As compared with an active converter, the current flowing between the one end 211 of the coil L3 and the position 213 and between the other end 212 and the position 213 can be half of the current flowing in the three-phase ac reactor of the active converter. Also, the copper losses between the one end 211 of the coil L3 and the position 213 and between the other end 212 and the position 213 are reduced to 1/12 times as compared with the copper loss in the three-phase ac reactor.

Third Preferred Embodiment

Figure 14:
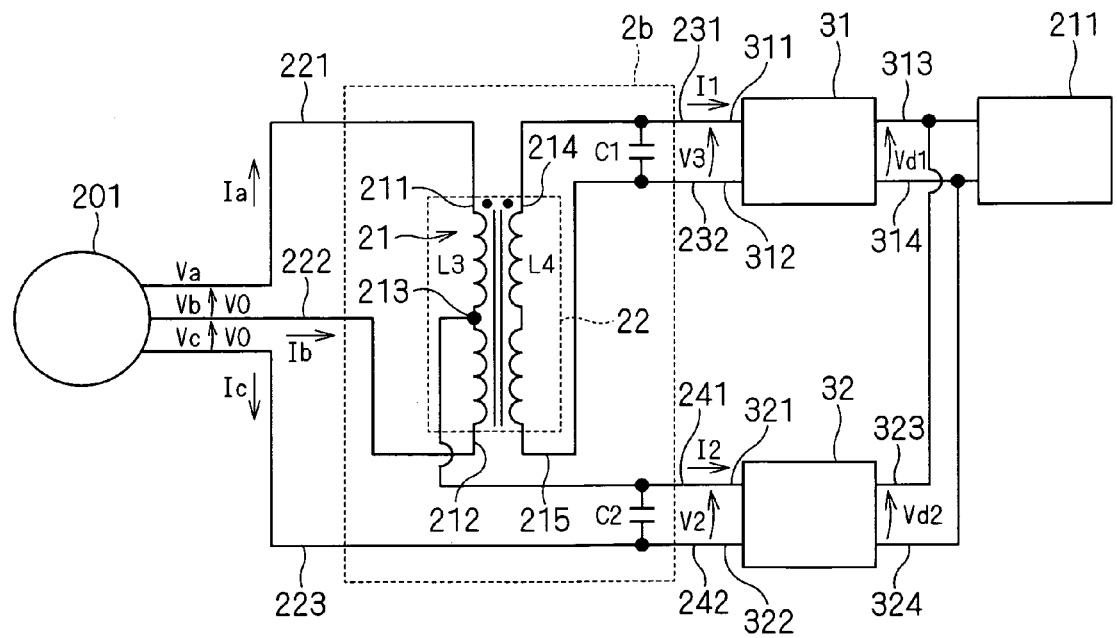
FIGS. 14 and 15 are circuit diagrams conceptually illustrating a power conversion system according to a third preferred embodiment.
Figure 15:
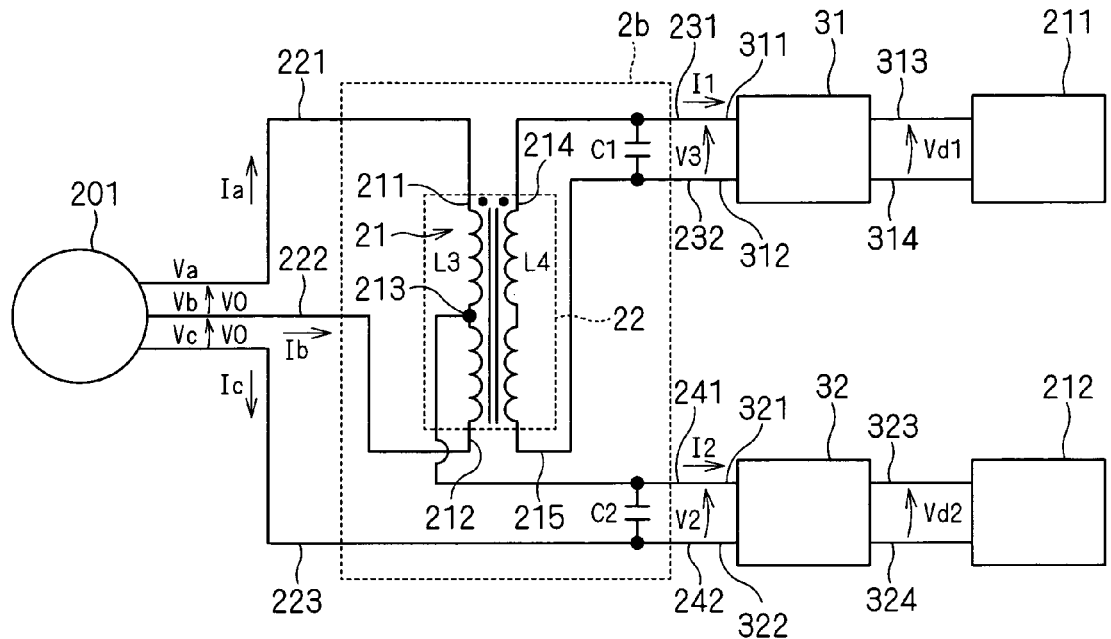

FIGS. 14 and 15 are circuit diagrams conceptually illustrating power conversion systems according to this preferred embodiment. According to the power conversion systems, in the power conversion systems shown in FIGS. 12 and 13, the power conversion device 2a further includes an insulation transformer 22. FIGS. 14 and 15 show the power conversion devices with reference character 2b.

The insulation transformer 22 is connected between the first output terminals 231 and 232 and the input terminals 221 and 222. The insulation transformer 22 has a primary coil and a secondary coil L4, where the coil L3 is the primary coil. The first output terminals 231 and 232 are connected to both ends 214 and 215 of the secondary coil L4.

According to the power conversion device 2b, an alternating voltage V1 generated between both ends 211 and 212 of the coil L3 and equal to the line voltage V0 of the three-phase power supply 201 can be converted into a desired alternating voltage V3, and outputted from the output terminals 231 and 232. Accordingly, it is possible to make the alternating voltage V3 equal to the alternating voltage V2 outputted from the output terminals 241 and 242.

Connecting a capacitor C1 between both ends 214 and 215 of the secondary coil L4 is desirable. This is because the capacitor C1 and the secondary coil L4 constitute a filter, and the filter removes noise.

As in the second preferred embodiment, the converters 31 and 32 are connected to the power conversion device 2b, and offer the same effects as those of the second preferred embodiment. PFC circuits (FIGS. 3 and 26 to 40) can be adopted for the converters 31 and 32.

Like the circuit shown in FIG. 12, FIG. 14 shows an example in which a load 211 is connected to the converters 31 and 32. In this case, as described in the first preferred embodiment, the power P1 and the power P2 are nearly equal. Connecting a capacitor Cd between the output ends 313 and 314 is desirable from the same viewpoint as described in the first preferred embodiment.

Also, like the circuit shown in FIG. 13, FIG. 15 shows an example in which loads 211 and 212 are connected respectively to the converters 31 and 32. In this case, as described in the first preferred embodiment, by control of the converters 31 and 32, the power P1 and the power P2 are set nearly equal. Connecting a capacitor Cd1 between the output ends 313 and 314, and a capacitor Cd2 between the output ends 323 and 324, is desirable from the same viewpoint as described in the first preferred embodiment.

Figure 16:
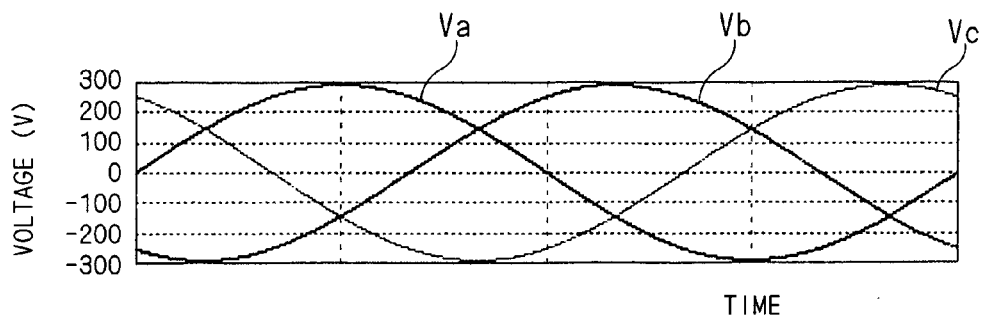
FIG. 16 is a diagram illustrating the waveforms of three-phase alternating voltages Va, Vb and Vc.
Figure 17:
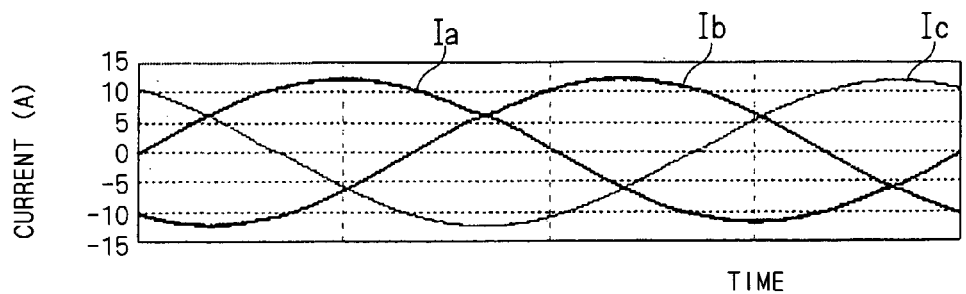
FIG. 17 is a diagram illustrating the waveforms of three-phase alternating currents Ia, Ib and Ic.
Figure 18:
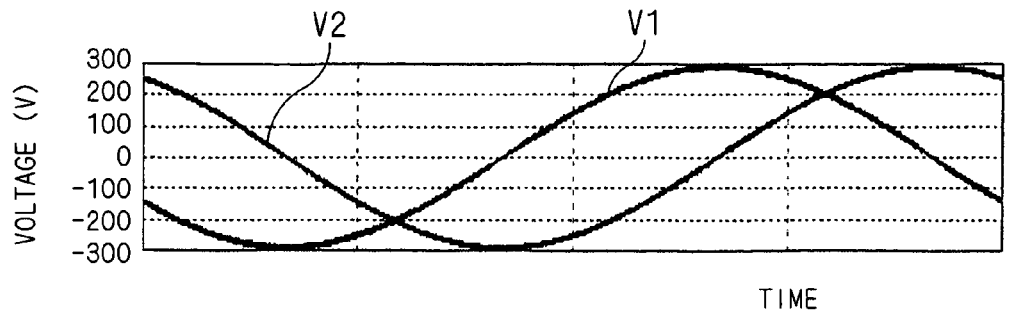
FIG. 18 is a diagram illustrating the waveforms of alternating voltages V1 and V2.
Figure 19:
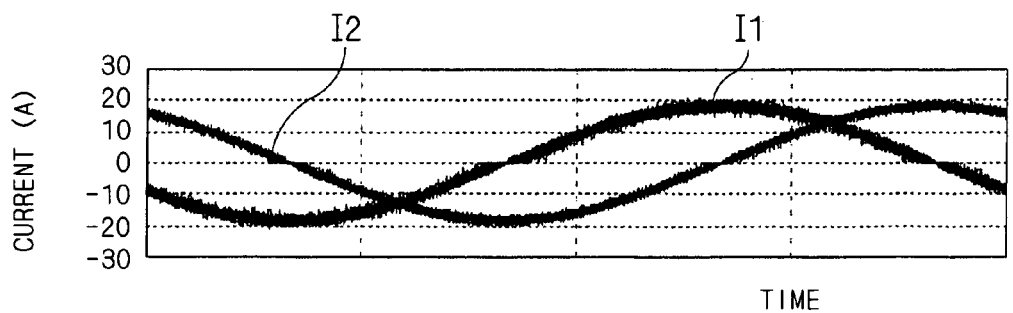
FIG. 19 is a diagram illustrating the waveforms of alternating currents I1 and I2.

When the PFC circuit 501 (FIG. 3) is adopted for the converters 31 and 32 of the power conversion system shown in FIG. 14, the three-phase alternating currents Ia, Ib and Ic (FIG. 14) exhibit the waveforms of FIG. 17, the alternating voltages V1 and V2 exhibit the waveforms of FIG. 18, and the alternating currents I1 and I2 exhibit the waveforms of FIG. 19. Where the three-phase alternating voltages Va, Vb and Vc (FIG. 14) as shown in FIG. 16 are inputted respectively to the input terminals 221 to 223.

Figure 20:
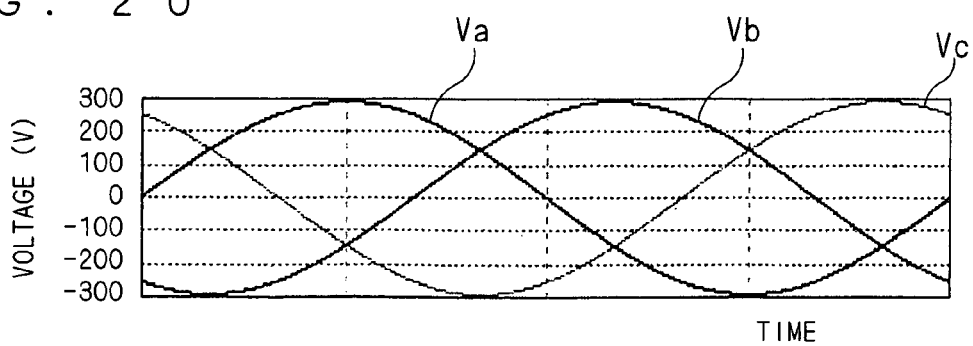
FIG. 20 is a diagram illustrating the waveforms of three-phase alternating voltages Va, Vb and Vc.
Figure 21:
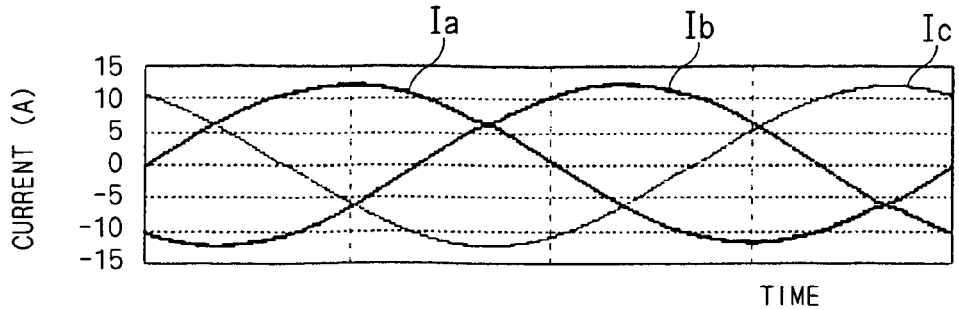
FIG. 21 is a diagram illustrating the waveforms of three-phase alternating currents Ia, Ib and Ic.
Figure 22:
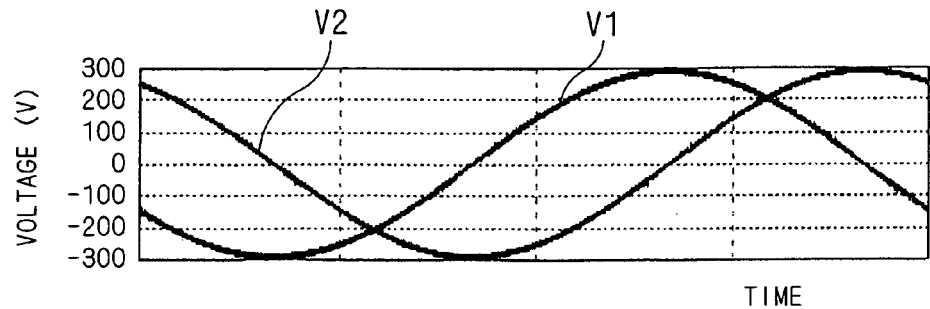
FIG. 22 is a diagram illustrating the waveforms of alternating voltages V1 and V2.
Figure 23:
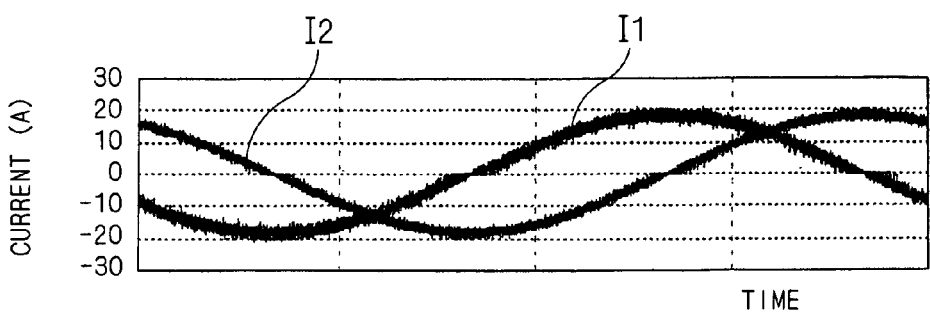
FIG. 23 is a diagram illustrating the waveforms of alternating currents I1 and I2.

When the PFC circuit 501 (FIG. 3) is adopted for the converters 31 and 32 of the power conversion system shown in FIG. 15, the three-phase alternating currents Ia, Ib and Ic (FIG. 15) exhibit the waveforms of FIG. 21, the alternating voltages V1 and V2 exhibit the waveforms of FIG. 22, and the alternating currents I1 and I2 exhibit the waveforms of FIG. 23. Where the three-phase alternating voltages Va, Vb and Vc (FIG. 15) as shown in FIG. 20 are inputted respectively to the input terminals 221 to 223.

The three-phase alternating currents Ia, Ib and Ic (FIGS. 17 and 21), the alternating voltages V1 and V2 (FIGS. 18 and 22), and the alternating currents I1 and I2 (FIGS. 19 and 23) are all sinusoidal waves, and they contain almost no noise other than chopper noise of the PFC circuit 501.

In the power conversion systems of this preferred embodiment, the power capacitance Pr3 of the power conversion device 2b is expressed by Expression (3).

[Expression 3]

$$Pr3 = \sum_{n=1}^{2} Vrn \times Irn \quad (3)$$

$$= \frac{1}{\sqrt{3}} \times \left(\sqrt{3} \times Vr \times Ir\right) \wedge$$

Then, the power capacitance Pr3 is 57.7% of the input capacitance.

Fourth Preferred Embodiment

Figure 24:
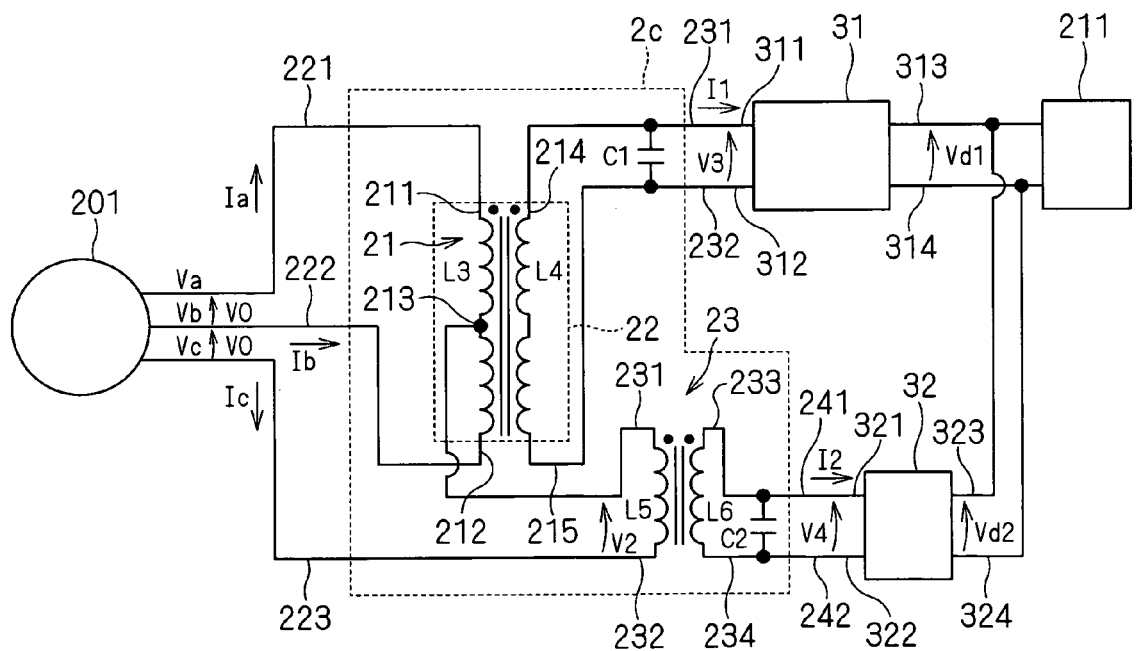
FIGS. 24 and 25 are circuit diagrams conceptually illustrating a power conversion system according to a fourth preferred embodiment.
Figure 25:
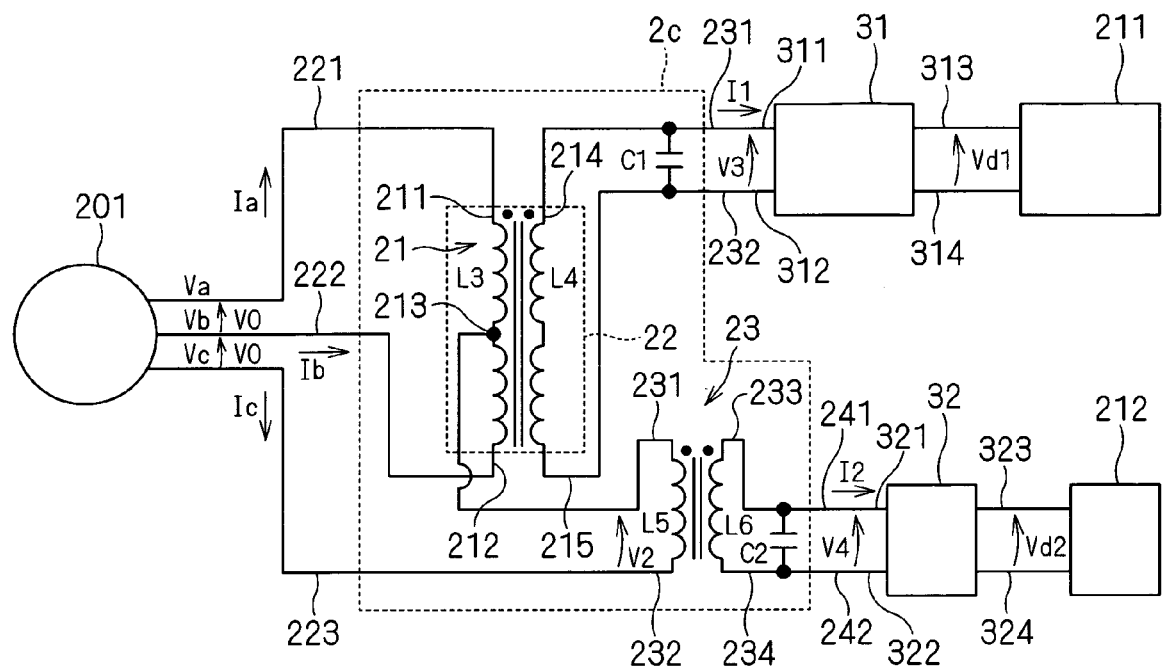

FIGS. 24 and 25 are circuit diagrams conceptually illustrating power conversion systems according to this preferred embodiment. According to the power conversion systems, respectively in the power conversion systems shown in FIGS. 14 and 15, the power conversion device 2b further includes an insulation transformer 23. FIGS. 24 and 25 show the power conversion devices with reference character 2c.

The insulation transformer 23 is connected between the output terminals 241 and 242 and the input terminal 223 and position 213. The insulation transformer 23 has a primary coil L5 and a secondary coil L6. The position 213 and the input terminal 223 are connected respectively to both ends 231 and 232 of the primary coil L5. The output terminals 241 and 242 are connected respectively to both ends 233 and 234 of the secondary coil L6.

According to the power conversion device 2c, it is possible to convert an alternating voltage V2 applied to the primary coil L5 into a desired alternating voltage V4, and to output it to the output terminals 241 and 242.

Connecting a capacitor C2 between both ends 233 and 234 of the secondary coil L6 is desirable. This is because the capacitor C2 and the secondary coil L6 constitute a filter, and the filter removes noise.

As in the third preferred embodiment, the converters 31 and 32 are connected to the power conversion device 2c, and offer the same effect as described in the third preferred embodiment.

Like the circuit shown in FIG. 14, FIG. 24 shows an example in which a load 211 is connected to the converters 31 and 32. In this case, as described in the first preferred embodiment, the power P1 and the power P2 are nearly equal. Connecting a capacitor Cd between the output ends 313 and 314 is desirable from the same viewpoint as described in the first preferred embodiment.

Also, like the circuit shown in FIG. 15, FIG. 25 shows an example in which loads 211 and 212 are connected respectively to the converters 31 and 32. In this case, as described in the first preferred embodiment, by control of the converters 31 and 32, the power P1 and the power P2 are set nearly equal. Connecting a capacitor Cd1 between the output ends 313 and 314, and a capacitor Cd2 between the output ends 323 and 324, is desirable from the same viewpoint as described in the first preferred embodiment.

As in the third preferred embodiment, the PFC circuit 501 (FIG. 3), for example, can be adopted for the converters 31 and 32. In this case, in the power conversion system shown in FIG. 24, the three-phase alternating currents Ia, Ib and Ic exhibit the waveforms of FIG. 17, the alternating voltages V1 and V2 exhibit the waveforms of FIG. 18, and the alternating currents I1 and I2 exhibit the waveforms of FIG. 19. In the power conversion system shown in FIG. 25, the three-phase alternating currents Ia, Ib and Ic exhibit the waveforms of FIG. 21, the alternating voltages V1 and V2 exhibit the waveforms of FIG. 22, and the alternating currents I1 and I2 exhibit the waveforms of FIG. 23.

EXAMPLES

For the converters 31 and 32, the PFC circuits illustrated in FIGS. 26 to 40, for example, can be adopted as well as the PFC circuit 501 shown in FIG. 3.

Figure 26:
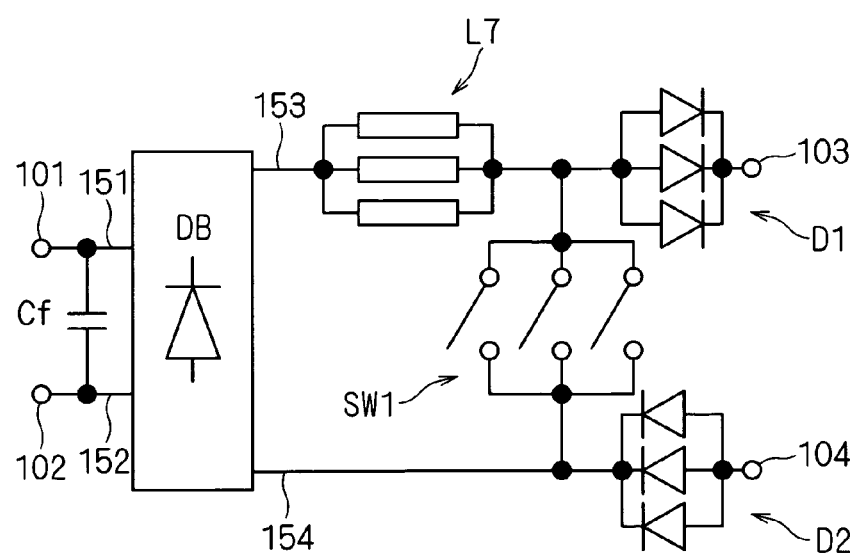

In the PFC circuit shown in FIG. 26, the coil L7, diodes D1 and D2, and switch SW1 as illustrated in the PFC circuit 501 of FIG. 3 are configured as shown below.

That is, the coil L7 is composed of three coils connected in parallel. The diodes D1 and D2 are each composed of three diodes connected in parallel. The three diodes have their anodes connected together and their cathodes connected together. The switch SW1 is composed of three switches connected in parallel.

Figure 27:
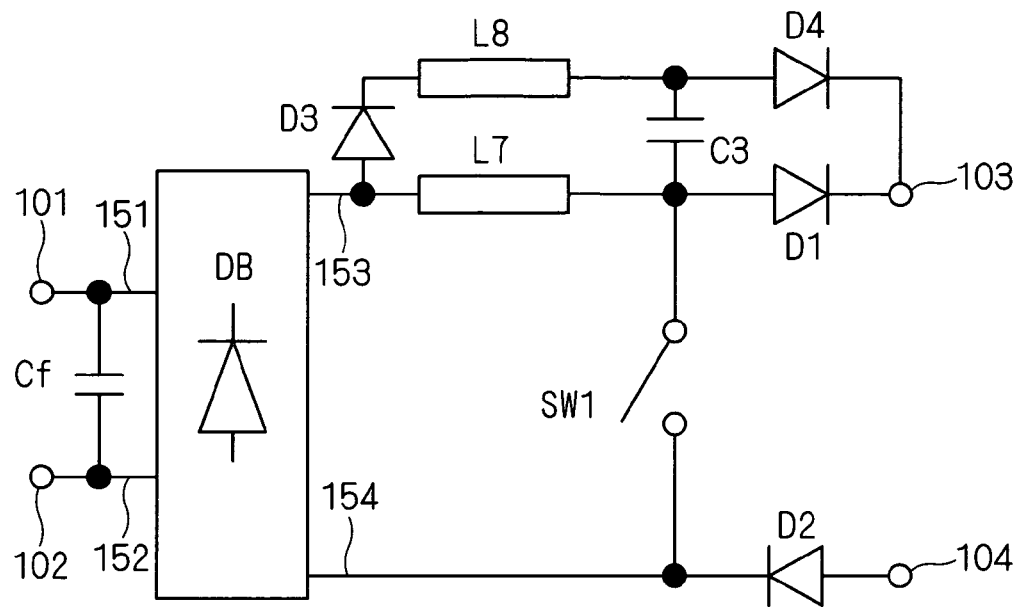

In the PFC circuit shown in FIG. 27, the PFC circuit 501 further includes a coil L8, diodes D3 and D4, and a capacitor C3.

The diode D3 has its anode connected to the output end 153 of the diode bridge DB, and its cathode connected to the anode of the diode D4 through the coil L8. The cathode of the diode D4 is connected to the output end 103. The capacitor C3 is connected between the anode of the diode D1 and the anode of the diode D4.

Figure 28:
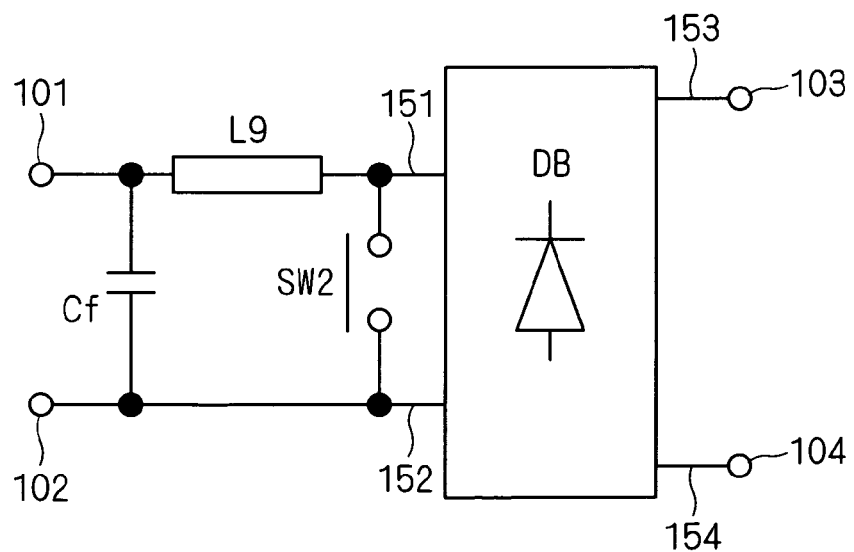

The PFC circuit shown in FIG. 28 includes a diode bridge DB, a capacitor Cf, a coil L9, and a switch SW2.

The diode bridge DB has its input end 151 connected to the input end 101 through the coil L9, and its input end 152 connected to the input end 102. The output ends 153 and 154 are connected respectively to the output ends 103 and 104. The capacitor Cf is connected between the input ends 101 and 102. The switch SW2 is connected between the input ends 151 and 152.

The PFC circuit shown in FIG. 29 includes a capacitor Cf, a coil L10, diodes D5 and D6, and switches SW3 and SW4.

The diode D5 has its anode connected to the input end 101 through the coil L10, and its cathode connected to the output end 103. The diode D6 has its anode connected to the input end 102, and its cathode connected to the output end 103. The switch SW3 is connected between the anode of the diode D5 and the output end 104. The switch SW4 is connected between the anode of the diode D6 and the output end 104. The capacitor Cf is connected between the input ends 101 and 102. This PFC circuit is capable of performing PWM (Pulse Width Modulation) control.

The PFC circuit shown in FIG. 30 adopts switches SW5 and SW6 in place of the diodes D5 and D6 in the PFC circuit of FIG. 29

Figure 31:
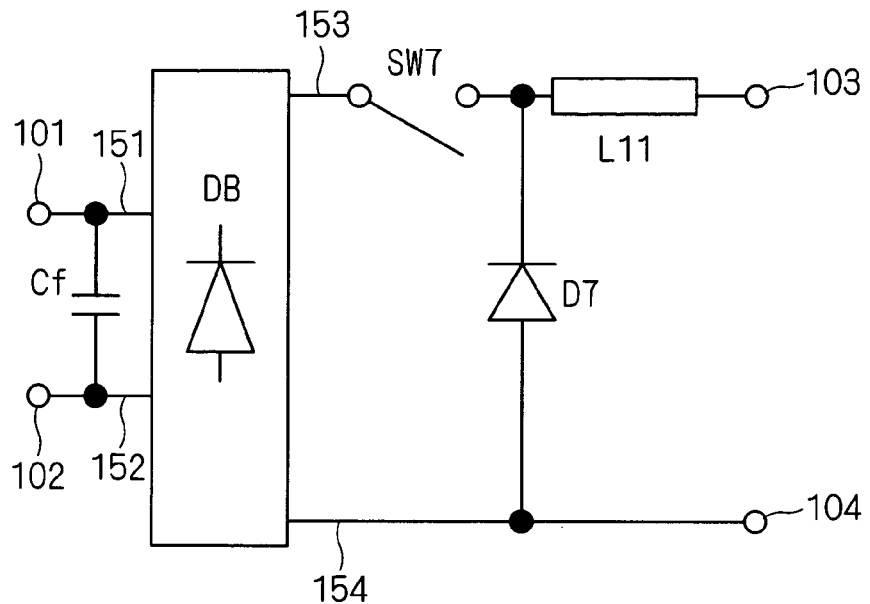

The PFC circuit shown in FIG. 31 includes a diode bridge DB, a capacitor Cf, a coil L11, a diode D7, and a switch SW7.

The diode bridge DB has its input ends 151 and 152 connected respectively to the input ends 101 and 102. The output end 153 is connected to the output end 103 through the switch SW7 and the coil L11 in this order. The output end 154 is connected to the output end 104. The diode D7 has its anode connected to the output end 104, and its cathode connected between the switch SW7 and the coil L11. The capacitor Cf is connected between the input ends 101 and 102. This PFC circuit functions as a step-down chopper.

Figure 32:
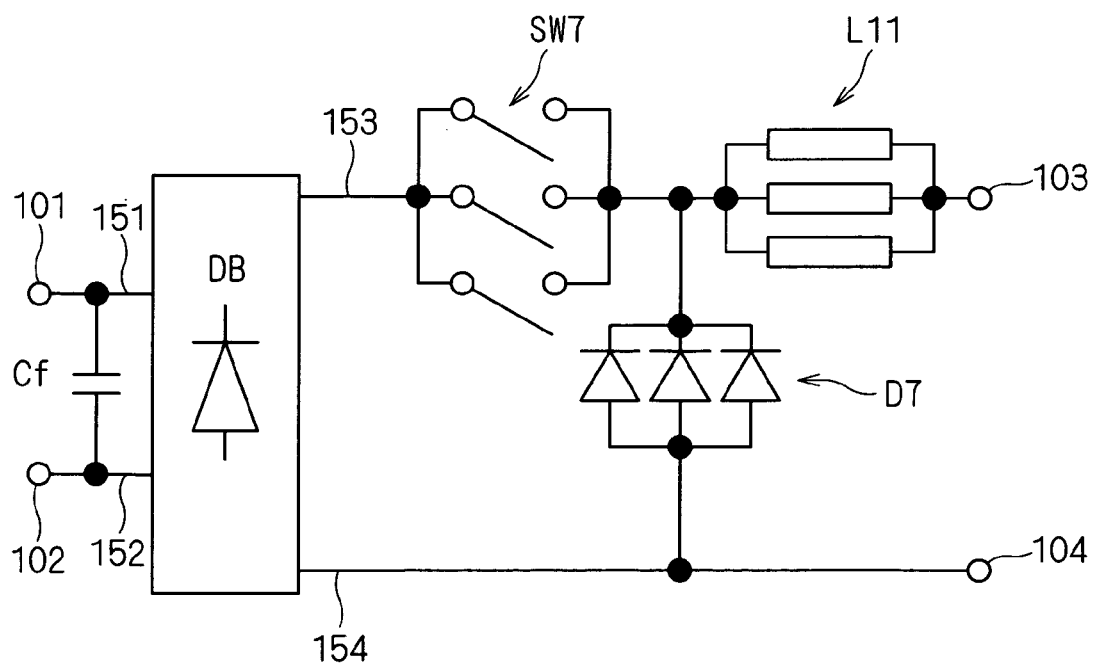

In the PFC circuit shown in FIG. 32, the coil L11, diode D7 and switch SW7 in the PFC circuit of FIG. 31 are configured as shown below.

That is, the coil L11 is composed of three coils connected in parallel. The diode D7 is composed of three diodes connected in parallel. The three diodes have their anodes connected together and their cathodes connected together. The switch S7 is composed of three switches connected in parallel.

Figure 33:
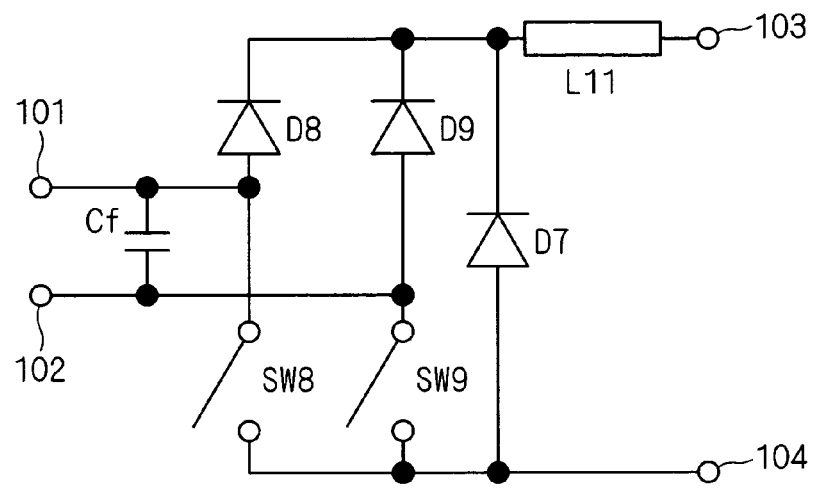

The PFC circuit shown in FIG. 33 includes a capacitor Cf, a coil L11, diodes D7 to D9, and switches SW8 and SW9.

The diode D7 has its anode connected to the output end 104, and its cathode connected to the output end 103 through the coil L11. The diode D8 has its anode connected to the input end 101, and its cathode connected to the cathode of the diode D7. The diode D9 has its anode connected to the input end 102, and its cathode connected to the cathode of the diode D7. The switch SW8 is connected between the anode of the diode D8 and the output end 104. The switch SW9 is connected between the anode of the diode D9 and the output end 104. The capacitor Cf is connected between the input ends 101 and 102. This PFC circuit functions as a step-down chopper, and is also capable of performing PWM control.

Figure 34:
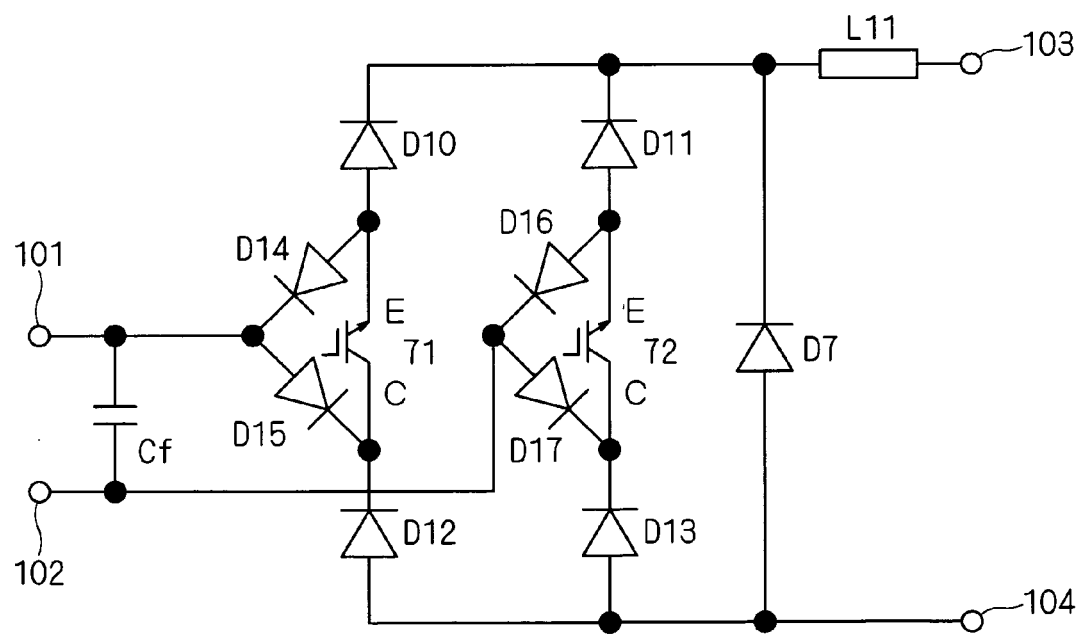

The PFC circuit shown in FIG. 34 includes a capacitor Cf, a coil L11, diodes D7, D10 to D17, and IGBTs (Insulated Gate Bipolar Transistors) 71 and 72.

The diode D7 has its anode connected to the output end 104, and its cathode connected to the output end 103 through the coil L11. The diode D10 has its anode connected to the emitter of the IGBT 71, and its cathode connected to the cathode of the diode D7. The diode D11 has its anode connected to the emitter of the IGBT 72, and its cathode connected to the cathode of the diode D7. The diode D12 has its anode connected to the output end 104, and its cathode connected to the collector of the IGBT 71. The diode D13 has its anode connected to the output end 104, and its cathode connected to the collector of the IGBT 72.

The diode D14 has its anode connected to the emitter of the IGBT 71, and its cathode connected to the input end 101. The diode D15 has its anode connected to the input end 101, and its cathode connected to the collector of the IGBT 71. The diode D16 has its anode connected to the emitter of the IGBT 72, and its cathode connected to the input end 102. The diode D17 has its anode connected to the input end 102, and its cathode connected to the collector of the IGBT 72. The capacitor Cf is connected between the input ends 101 and 102. This PFC circuit functions as a step-down chopper, and is also capable of performing PWM control.

The PFC circuit shown in FIG. 35 adopts switches SW10 and SW11 in place of the diodes D8 and D9 of the PFC circuit shown in FIG. 33.

Figure 38:
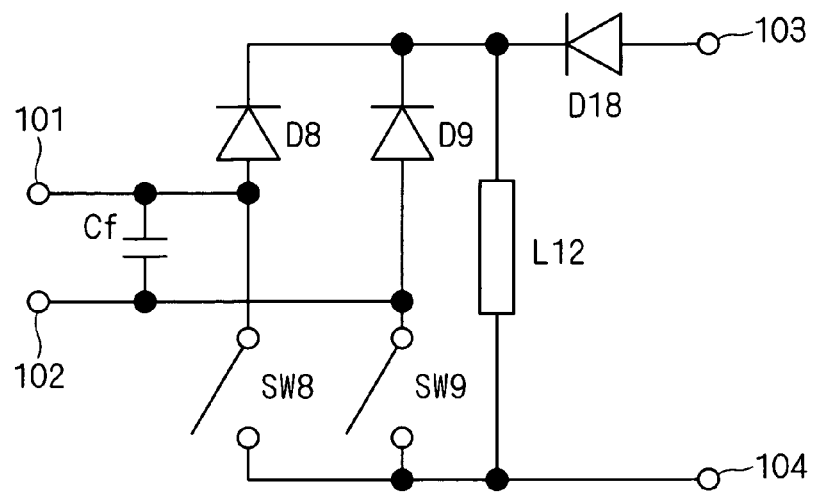
Figure 39:
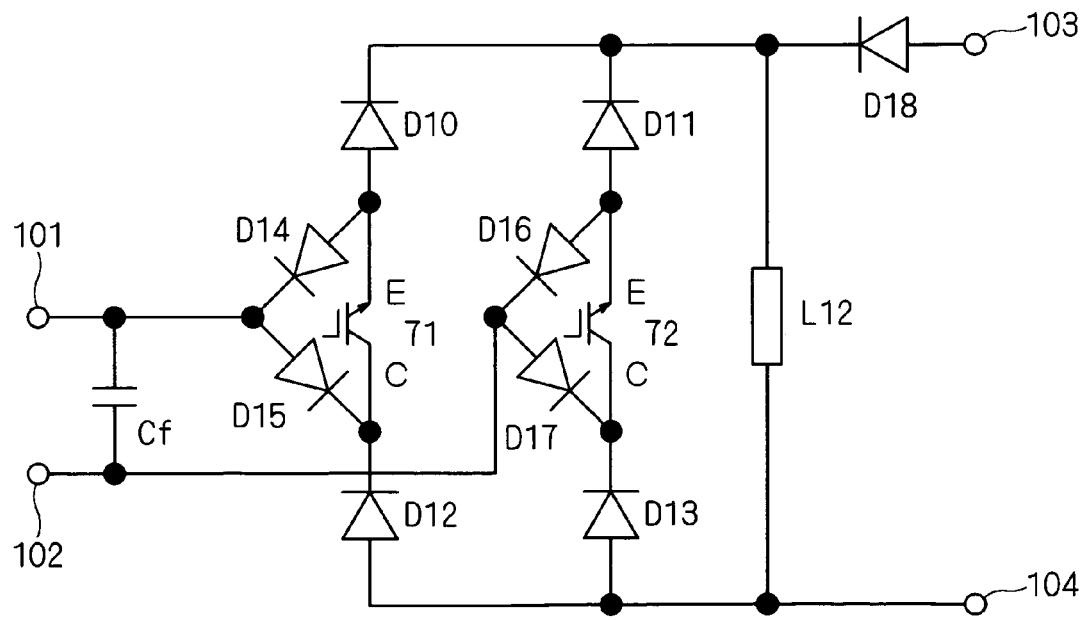
Figure 40:
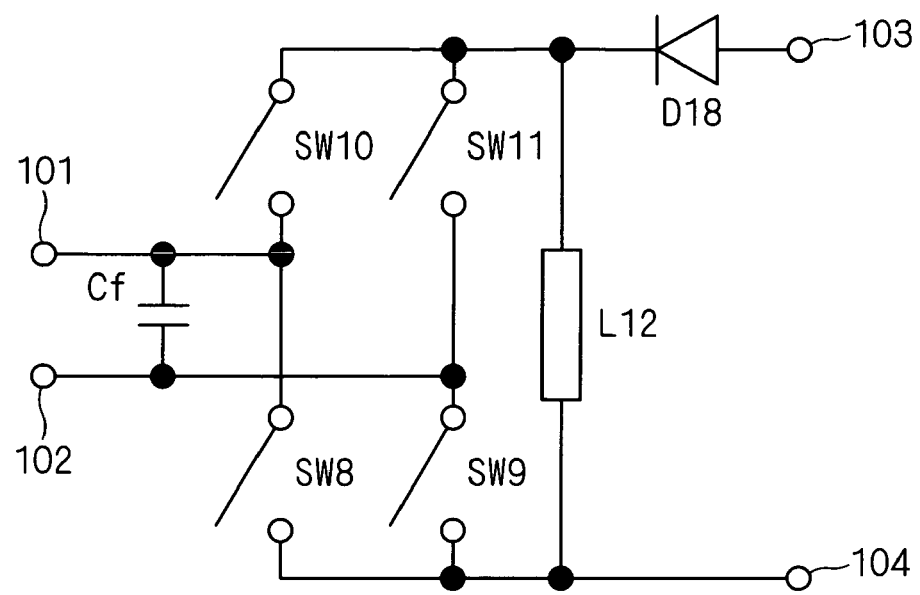

In the PFC circuits shown in FIGS. 36 to 40, respectively in the PFC circuits shown in FIGS. 31 to 35, a diode D18 is connected in place of the coil L11, and a coil L12 is connected in place of the diode D7. The diode D18 has its anode connected to the output end 103. The PFC circuits function as step-up choppers. In particular, the PFC circuits shown in FIGS. 38 to 40 are capable of performing PWM control.

The PFC circuits shown in FIGS. 26 to 40 include four switching elements at most. Accordingly, in all preferred embodiments described above, the numbers of switching elements included in the power conversion systems are smaller than the numbers of switching elements included in active converters or matrix converters.

While the invention has been described in detail, the foregoing description is in all aspects illustrative and not restrictive. It is understood that numerous other modifications and variations can be devised without departing from the scope of the invention.

The invention claimed is:

1. A power conversion device comprising:
an insulation transformer having a primary coil and a secondary coil of equal inductance;
first to third input terminals;
a pair of first output terminals; and
a pair of second output terminals,
one of said first output terminals being connected to said first input terminal and one end of said primary coil,
the other of said first output terminals being connected to said second input terminal and one end of said secondary coil,
one of said second output terminals being connected to the other end of said primary coil and the other end of said secondary coil,
the other of said second output terminals being connected to said third input terminal,
said one end of said primary coil having a polarity same as that of said other end of said secondary coil.

2. A power conversion device comprising:
a coil;
first to third input terminals;
a pair of first output terminals; and
a pair of second output terminals,
one of said first output terminals being connected to said first input terminal and one end of said coil,
the other of said first output terminals being connected to said second input terminal and the other end of said coil,
one of said second output terminals being connected to said coil at a position between said one end and said other end of said coil,
the other of said second output terminals being connected to said third input terminal,
inductance between said one end of said coil and said position and inductance between said other end of said coil and said position being equal to each other.

3. The power conversion device according to claim 2, further comprising a first insulation transformer connected between said pair of said first output terminals and said first and second input terminals,
wherein said pair of said first output terminals are connected to both ends of a secondary coil of said first insulation transformer, and
said first insulation transformer has said coil as a primary coil.

4. The power conversion device according to claim 3, further comprising a capacitor, wherein said first capacitor is connected between both the ends of said secondary coil of said first insulation transformer.

5. A power conversion system comprising:
the power conversion device according to claim 1; and
a first converter having a pair of input ends and a pair of output ends,
said pair of said input ends of said first converter being connected to one pair of said pairs of said first output terminals and said second output terminals.

6. A power conversion system comprising:
the power conversion device according to claim 2; and
a first converter having a pair of input ends and a pair of output ends,
said pair of said input ends of said first converter being connected to one pair of said pairs of said first output terminals and said second output terminals.

7. The power conversion system according to claim 5, further comprising a second converter having a pair of input ends and a pair of output ends;

said pair of said input ends of said second converter being connected to the other pair of said pairs of said first output terminals and said second output terminals.

8. The power conversion system according to claim 6, further comprising a second converter having a pair of input ends and a pair of output ends;
said pair of said input ends of said second converter being connected to the other pair of said pairs of said first output terminals and said second output terminals.

9. The power conversion device according to claim 3, further comprising a second insulation transformer connected between said pair of said second output terminals and said third input terminal and said position,
wherein said third input terminal and said position are respectively connected to both ends of a primary coil of said second insulation transformer, and
said pair of said second output terminals are respectively connected to both ends of a secondary coil of said second insulation transformer.

10. A power conversion system comprising:
the power conversion device according to claim 9; and
a first converter having a pair of input ends and a pair of output ends;
said pair of said input ends of said first converter being connected to one pair of said pairs of said first output terminals and said second output terminals.

11. The power conversion system according to claim 10, further comprising a second converter having a pair of input ends and a pair of output ends;
said pair of said input ends of said second converter being connected to the other pair of said pairs of said first output terminals and said second output terminals.

12. The power conversion device according to claim 9, further comprising a capacitor, wherein said second capacitor is connected between said both ends of said secondary coil of said second insulation transformer.

13. A power conversion system comprising:
the power conversion device according to claim 12; and
a first converter having a pair of input ends and a pair of output ends,
said pair of said input ends of said first converter being connected to one pair of said pairs of said first output terminals and said second output terminals.

14. The power conversion system according to claim 13, further comprising a second converter having a pair of input ends and a pair of output ends,
said pair of said input ends of said second converter being connected to the other pair of said pairs of said first output terminals and said second output terminals.

* * * * *